United States Patent
Ode et al.

(10) Patent No.: US 10,993,286 B2
(45) Date of Patent: Apr. 27, 2021

(54) WIRELESS BASE STATION, WIRELESS APPARATUS, WIRELESS CONTROL APPARATUS, WIRELESS COMMUNICATION SYSTEM, COMMUNICATION METHOD, AND WIRELESS TERMINAL

(71) Applicant: FUJITSU LIMITED, Kawasaki (JP)

(72) Inventors: Takayoshi Ode, Yokohama (JP);
Yoshiaki Ohta, Yokohama (JP);
Shinichiro Aikawa, Yokohama (JP);
Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/018,337

(22) Filed: Sep. 11, 2020

(65) Prior Publication Data

US 2020/0413487 A1    Dec. 31, 2020

Related U.S. Application Data

(60) Division of application No. 16/264,965, filed on Feb. 1, 2019, which is a continuation of application No. PCT/JP2016/073752, filed on Aug. 12, 2016.

(51) Int. Cl.
*H04W 88/08*    (2009.01)

(52) U.S. Cl.
CPC ......... *H04W 88/085* (2013.01); *H04W 88/08* (2013.01)

(58) Field of Classification Search
CPC ......... H04W 72/1263; H04W 72/1252; H04W 72/1257; H04W 72/1236
See application file for complete search history.

(56) References Cited

U.S. PATENT DOCUMENTS

| 7,492,325 B1* | 2/2009 | Moosbrugger .... H01Q 21/0087 |
| | | 342/373 |
| 2006/0045032 A1* | 3/2006 | Hamada .................. H04L 1/188 |
| | | 370/278 |

(Continued)

FOREIGN PATENT DOCUMENTS

| EP | 2 753 143 A1 | 7/2014 |
| EP | 2 785 139 A1 | 10/2014 |

(Continued)

OTHER PUBLICATIONS

Ericsson et al., "Common Public Radio Interface", pp. 1-25, Mar. 11, 2015.

(Continued)

*Primary Examiner* — Joshua L Schwartz
(74) *Attorney, Agent, or Firm* — Myers Wolin, LLC

(57) ABSTRACT

A wireless base station for communicating with a wireless terminal includes: a wireless apparatus configured to perform a first part of signal processing, the first part of signal processing including wireless signal processing among signal processing of the wireless base station; a wireless control apparatus configured to perform a second part of signal processing, the second part of signal processing being different from the first part of signal processing, the signal processing of wireless terminal user data split between the wireless apparatus and the wireless control apparatus of the wireless base station, the wireless apparatus and the wireless control apparatus of the base station connected via a transmission path, and the second part of signal processing of the wireless terminal user data in a unit of packet data convergence protocol packet data unit (PDCP PDU).

15 Claims, 21 Drawing Sheets

(56) References Cited

U.S. PATENT DOCUMENTS

| | | | | |
|---|---|---|---|---|
| 2006/0045041 A1* | 3/2006 | Yuuki | ............... | H04W 28/18 370/321 |
| 2015/0029965 A1* | 1/2015 | Aminaka | ......... | H04W 72/1263 370/329 |
| 2017/0070908 A1 | 3/2017 | Ogura | | |
| 2017/0156142 A1* | 6/2017 | Sato | ............... | H04L 27/2601 |

FOREIGN PATENT DOCUMENTS

| | | |
|---|---|---|
| JP | 2008-193558 A | 8/2008 |
| JP | 2015-226071 A | 12/2015 |
| JP | 2016-36083 A | 3/2016 |
| WO | 2008/095241 A1 | 8/2008 |
| WO | 2011/052870 A1 | 5/2011 |
| WO | 2013/076900 A1 | 5/2013 |
| WO | 2015/136875 A1 | 9/2015 |

OTHER PUBLICATIONS

International Search Report issued by the Japan Patent Office for corresponding International Patent Application No. PCT/JP2016/073752, dated Nov. 1, 2016, with an English translation.

Written Opinion for the International Searching Authority issued for corresponding International Patent Application No. PCT/JP2016/073752, dated Nov. 1, 2016, with an English translation.

Non-Final Office Action issued by the United States Patent and Trademark Office for corresponding U.S. Appl. No. 16/264,965, electronically delivered on Nov. 29, 2019.

Final Office Action issued by the United States Patent and Trademark Office for corresponding U.S. Appl. No. 16/264,965, electronically delivered on Jun. 11, 2020.

Notice of Reasons for Refusal issued by the Japan Patent Office for corresponding Japanese Patent Application No. 2018-533397, dated Feb. 25, 2020, with a full English machine translation.

Intel Corporation, "Fronthaul and RAN functional split aspects of the next generation radio access network", Agenda Item: 10.5, 3GPP TSG-RAN WG3 Meeting #91BIS, R3-160622, Bangalore, India, Apr. 11-15, 2016.

NEC, "RAN architecture impact due to different functional split options", Agenda Item: 9.5.1, 3GPP TSG-RAN WG2 Meeting #93BIS, R2-162890, Dubrovnik, Croatia, Apr. 11-15, 2016.

Extended European search report with supplementary European search report and the European search opinion issued by the European Patent Office for corresponding European Patent Application No. 16912733.9-1212, dated Mar. 11, 2020.

Decision of Refusal issued by the Japan Patent Office for corresponding Japanese Patent Application No. 2018-533397, dated Oct. 6, 2020, with full English machine translation.

* cited by examiner

FIG. 15

| DU CATEGORY (1 TO 8) | SPLIT POINT (1 TO 8) | TYPE OF TRANSFER DATA | PROTOCOL | FUNCTION | | | | | |
|---|---|---|---|---|---|---|---|---|---|
| | | | | RF | Phy | BB | MAC | RLC | PDCP |
| 1 | 8 | ANALOG IQ DATA | CPRI | ○ | | | | | |
| 2 | 7 | DIGITAL IQ DATA | P1 | ○ | ○ | | | | |
| 3 | 6 | MAC PDU | P2 | ○ | ○ | ○ | | | |
| 4 | 5 | MAC SDU | P3 | ○ | ○ | ○ | ○ (PORTION) | | |
| 5 | 4 | RLC PDU | P4 | ○ | ○ | ○ | ○ | | |
| 6 | 3 | RLC SDU | P5 | ○ | ○ | ○ | ○ | ○ (PORTION) | |
| 7 | 2 | PDCP PDU | P6 | ○ | ○ | ○ | ○ | ○ | |
| 8 | 1 | PDCP SDU | P7 | ○ | ○ | ○ | ○ | ○ | ○ (PORTION) |

| DU IDENTIFIER (0 TO 1023) | CELL ID (0 TO 503) | DOWNLINK FREQUENCY [MHz] | CELL SELECTION PARAMETER | DU CATEGORY |
|---|---|---|---|---|
| 1 | 10 | 2140 | | 1 |
| 2 | 10 | 3500 | | 3 |
| 3 | 11 | 3700 | | 5 |

2000

WIRELESS BASE STATION, WIRELESS APPARATUS, WIRELESS CONTROL APPARATUS, WIRELESS COMMUNICATION SYSTEM, COMMUNICATION METHOD, AND WIRELESS TERMINAL

CROSS-REFERENCE TO RELATED APPLICATION(S)

This application is a divisional of U.S. application Ser. No. 16/264,965 filed on Feb. 1, 2019, which is continuation application of International Application PCT/JP2016/073752 filed on Aug. 12, 2016 and designated the U.S., the entire contents of each are incorporated herein by reference.

FIELD

The present invention relates to a wireless base station (for example, an eNB), a wireless apparatus, a wireless control apparatus, a wireless communication system, a communication method, and a wireless terminal (for example, mobile equipment or a mobile terminal).

BACKGROUND

In the related art, mobile communication systems are known such as LTE that corresponds to a 3rd generation mobile communication system (3G) and a 3.9-th generation mobile communication system, and LTE-Advanced that corresponds to a 4-th generation mobile communication system. LTE is short for Long Term Evolution. A study on technologies relating to a 5-th generation mobile communication system (5G) has also been started. Split of signal processing (a signal processing function or a function) in a wireless base station in 5G into a Center Unit or Centralized Unit (CU) and a Distributed Unit (DU) has been studied.

A technology is known in which each wireless apparatus on an ad hoc network manages local link information, and performs formation and transmission of the local link information using a Hello message (for example, refer to following PTL 1). A technology is known in which, based on traffic control information, traffic control that includes priority control and route split is performed on a reception packet and thus the reception packet is output as an output packet (for example, refer to following PTL 2).

Examples of the related art include [PTL 1] Japanese Laid-open Patent Publication No. 2008-193558 and [PTL 2] International Publication Pamphlet No. WO 2015/136875.

SUMMARY

According to an aspect of the embodiment, a wireless base station for communicating with a wireless terminal includes: a wireless apparatus configured to perform a first part of signal processing, the first part of signal processing including wireless signal processing among signal processing of the wireless base station; a wireless control apparatus configured to perform a second signal part of processing, the second part of signal processing being different from the first part of signal processing; signal processing of wireless terminal user data split between the wireless apparatus and the wireless control apparatus of the base station, the wireless apparatus and the wireless control apparatus of the base station connected via a transmission path, the second part of signal processing of the wireless terminal user data in a unit of packet data convergence protocol packet data unit (PDCP PDU), the wireless control apparatus transferring the second part of signal processing of the wireless terminal user data to the wireless apparatus via the transmission path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram illustrating an example of a DU category in accordance with every split point of the base station signal processing according to the first embodiment.

FIG. 20 is a diagram illustrating an example of a DU list according to the second embodiment.

DESCRIPTION OF EMBODIMENTS

However, in the related art described above, it is recommended that, on a network or within the wireless base station, for example, multiple points of signal processing in the wireless base station are caused to be existed together, such as a point (a function split point (Function Split)) or the like at which the split of signal processing in the wireless base station into signal processing by the CU and signal processing by the DU takes place.

One aspect of the present invention is to serve the purpose of providing a wireless base station, a wireless apparatus, a wireless control apparatus, a wireless communication system, a communication method, and a wireless terminal, which are capable of making possible the coexistence of multiple split points of signal processing in the wireless base station.

A wireless base station, a wireless apparatus, a wireless control apparatus, a wireless control apparatus, a wireless communication system, a communication method, and a wireless terminal according to the present invention will be described in detail with reference to the drawings.

First Embodiment (Wireless Base Station According to a First Embodiment)

Figure 1:
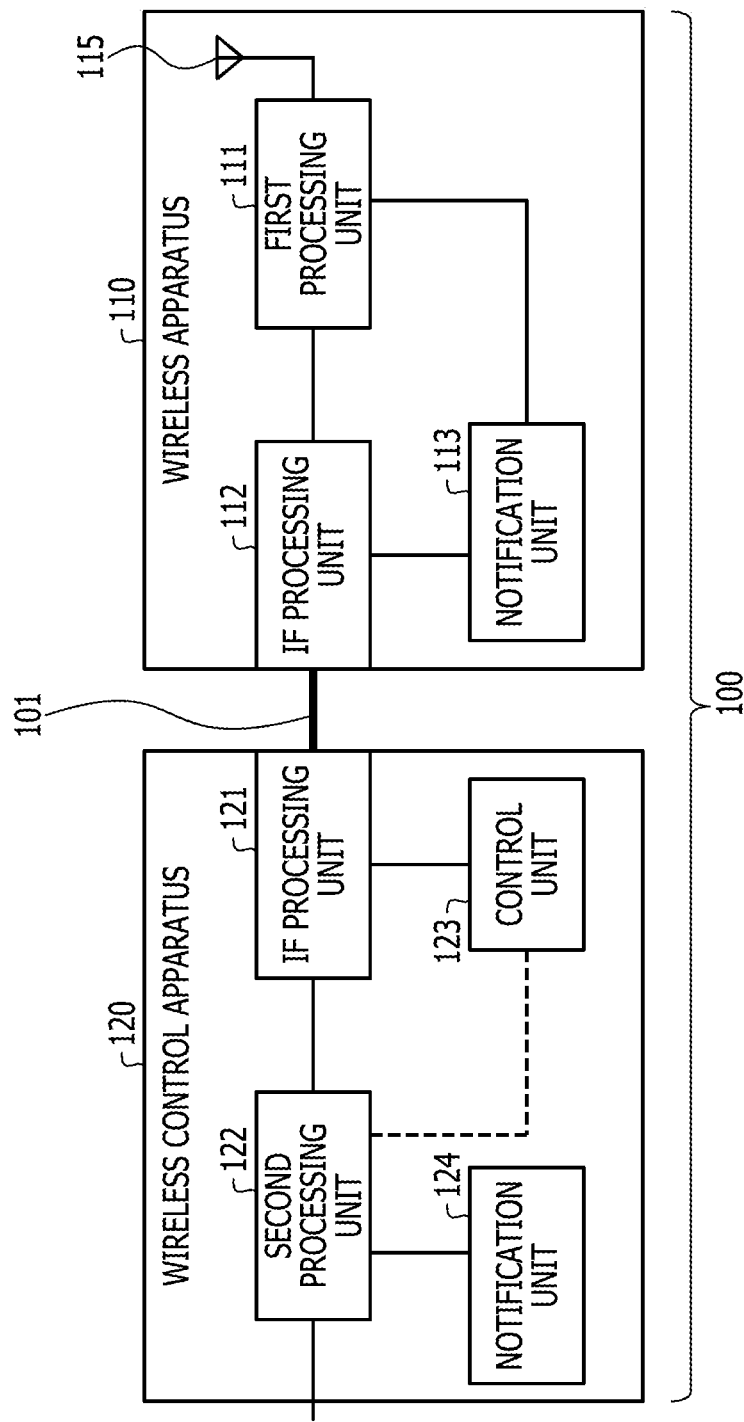
FIG. 1 is a diagram illustrating an example of a wireless base station according to a first embodiment.

FIG. 1 is a diagram illustrating an example of a wireless base station according to a first embodiment. As illustrated in FIG. 1, a wireless base station 100 according to the first embodiment includes a wireless apparatus 110 and a wireless control apparatus 120. The wireless base station 100 may include multiple wireless apparatuses 110. The wireless base station 100 performs communication with a wireless terminal. Wireless communications with the wireless terminal, for example, include transmission of a downlink signal from the wireless base station 100 to the wireless terminal or transmission of an uplink signal from the wireless terminal to the wireless base station 100 or any combination thereof.

A transfer path 101 connects between the wireless apparatus 110 and the wireless control apparatus 120. The transfer path 101, for example, is a wired transfer path that connects between the wireless apparatus 110 and the wireless control apparatus 120. For example, in a case where bidirectional signal transfer by the transfer path 101 is performed, the bidirectional signal transfer is performed with Wavelength Division Multiplexing (WDM) that uses wavelengths that differ from each other. A scheme other than WDM may be used.

As transfer of a signal by the transfer path 101, transfer of an electrical signal or transfer of an optical signal may be used. For example, for the transfer of the signal by the transfer path 101, Common Public Radio Interface (CPRI) or Open Base Station Architecture Initiative (OBSAI) may be used. As an example, CPRI is specified by the Institute of Electrical and Electronics Engineers (IEEE) 803. However, for the transfer of the signal by transfer path 101, which is not limited to these, various transfer methods may be used.

The wireless apparatus 110 performs wireless signal transmission and reception to and from the wireless terminal, using an antenna 115. As an example, a DU that have been studied in 5G can be applied in the wireless apparatus 110. For example, the wireless apparatus 110 includes a first processing unit 111, an IF processing unit 112, a notification unit 113, and the antenna 115. The first processing unit may be referred to as a first signal processing unit. The wireless apparatus 110 may include a notification unit 124.

The first processing unit 111 performs first signal processing, as each processing (hereinafter referred to as base station signal processing) by the wireless base station 100, which includes wireless signal processing, on a signal that is to be transferred by the wireless base station 100 to the wireless terminal. The wireless signal processing, for example, includes the wireless signal transmission and reception of the signal, which use the antenna 115, signal amplification processing, undesirable-signal removal that uses a filter, and the like. The signal transmission and reception is signal transmission or signal reception or any combination thereof.

For example, the first processing unit 111 performs reception processing that is included in the first signal processing, on a signal that is wirelessly transmitted from the wireless terminal, and outputs the signal on which the reception processing that is included in the first signal processing is performed, to the IF processing unit 112. The reception processing which is included in the first signal processing includes reception of a signal through the antenna 115. The first processing unit 111 performs transmission processing that is included in the first signal processing, on a signal that is output from the IF processing unit 112. The transmission processing that is included in the first signal processing includes wireless transmission of a signal to the wireless terminal through the antenna 115.

The IF processing unit 112 is an interface (IF) processing unit that performs communication with the wireless control apparatus 120 through the transfer path 101. For example, the IF processing unit 112 transmits a signal that is output from the first processing unit 111, to the wireless control apparatus 120 through the transfer path 101. The IF processing unit 112 receives the signal that is transmitted from the wireless control apparatus 120 through the transfer path 101, and outputs the received signal to the first processing unit 111.

The IF processing unit 112 transmits configuration information that is input from the notification unit 113, and transmits the configuration that is output, to the wireless control apparatus 120 through the transfer path 101. In a case where a configuration information request signal that request transmission of the configuration information is received from the wireless control apparatus 120, the IF processing unit 112 may output the received configuration information request signal to the notification unit 113.

The notification unit 113 outputs the configuration information in accordance with processing (distribution of the base station signal processing as the first signal processing), a function, or a function split, that is included in the first signal processing which is performed by the first processing unit 111, which is in the base station signal processing, to the IF processing unit 112. Accordingly, the configuration information may be transmitted to the wireless control apparatus 120 by the transfer path 101. The configuration information will be described below.

For example, in a case where the wireless control apparatus 120 and the wireless apparatus 110 are connected to each other, the notification unit 113 outputs the configuration information to the IF processing unit 112. In a case where the configuration information request signal is output from the IF processing unit 112, the notification unit 113 may output the configuration information to the IF processing unit 112. In a state where the wireless control apparatus 120 and the wireless apparatus 110 are connected to each other, in a case where notification unit 113 is instructed by an administrator of the wireless apparatus 110 to output the configuration information, the notification unit 113 may output the configuration information to the IF processing unit 112.

For example, the configuration information relating to the first signal processing by the first processing unit 111 is stored in a memory of the wireless apparatus 110 (for example, a nonvolatile memory). In this case, the notification unit 113 reads the configuration information that is stored in the memory of the wireless control apparatus 120, and outputs the configuration information that is read, to the IF processing unit 112.

Alternatively, information for generating the configuration information, which is information in accordance with the first signal processing by the first processing unit 111, may be stored in the memory (for example, the nonvolatile memory) of the wireless apparatus 110. In this case, the notification unit 113 reads the information that is stored in the memory of the wireless apparatus 110, and generates the configuration information based on the information that is read.

The notification unit 113 outputs the generated configuration information to the IF processing unit 112. Alternatively, the notification unit 113 may acquire the configuration information relating to the first signal processing by the first processing unit 111 from the first processing unit 111.

The wireless control apparatus 120 is provided the wireless apparatus 110 and an apparatus that is at a higher layer than the wireless apparatus 110, and controls the wireless signal processing by the wireless apparatus 110. The apparatus that is at a higher layer than the wireless apparatus 110, for example, is a communication apparatus on a core network of a mobile communication network (a wireless communication system) on which the wireless apparatus 110 is provided. A higher-layer apparatus may be an apparatus that is positioned more upstream on the network than the base station. For example, the higher-layer apparatus may be a higher-layer apparatus than the base station. Examples of the higher-layer apparatus include a Serving Gateway (SGW), a Mobility Management Entity (MME), and the like. The above-described SGW or MME is an apparatus in an LTE system that is a 4 G mobile communication system, which has been studied in 3GPP. The LTE system will be described below as an example, but application to any other wireless communication system is also possible unless otherwise specified.

As an example, a CU in 5G, which has been studied in 3GPP, can be applies in the wireless control apparatus 120. For example, the wireless control apparatus 120 includes an IF processing unit 121, a second processing unit 122, and a control unit 123. The second processing unit may be referred to as a second signal processing unit.

The IF processing unit 121 is an interface processing unit that receives a signal which is transmitted from the wireless apparatus 110 through the transfer path 101, and outputs the received signal to the second processing unit 122. The IF processing unit 121 transmits the signal that is output from the second processing unit 122, to the wireless apparatus 110 through the transfer path 101. The IF processing unit 121 outputs the configuration information that is included in the signal which is transmitted from the wireless apparatus 110 through the transfer path 101, to the control unit 123.

The second processing unit 122 performs the second processing that differs from the first signal processing by the wireless apparatus 110, which is in the base station signal processing. For example, processing that transmits a signal which is received by the wireless base station 100 from the wireless terminal, to a higher-layer apparatus in the wireless base station 100, and processing that receives a signal for the wireless terminal, which is transmitted from the higher-layer apparatus in the wireless base station 100, are included in the second signal processing.

For example, the second processing unit 122 performs the reception processing that is included in the second signal processing, on a signal that is output from the IF processing unit 121, and outputs the signal on which the reception processing is performed. The signal that is output from the second processing unit 122, for example, is transmitted to a higher-layer apparatus in the wireless base station 100. The second processing unit 122, for example, performs transmission processing that is included in the second signal processing, on a signal that is input from a higher-layer apparatus in the wireless base station 100 into the wireless control apparatus 120, and outputs the signal on which the transmission processing is performed, to the IF processing unit 121.

Based on the configuration information that is output from the IF processing unit 121, the control unit 123 sets processing that is included in the second processing unit 122 by the second signal processing. As an example, the control unit 123 specifies processing that is included in the first signal processing by the wireless apparatus 110, which is in the base station signal processing, based on the configuration information, and sets processing that results from excluding the specified processing from the base station signal processing, to be the second signal processing by the second processing unit 122.

Distribution of the base station signal processing as the first signal processing and the second signal processing is described. The base station signal processing in the wireless base station 100 is divided into the first signal processing by the first processing unit 111 of the wireless apparatus 110, and the second signal processing by the second processing unit 122 of the wireless control apparatus 120, for distributed processing. For example, multiple wireless base stations 100 are provided on the mobile communication network, and, among the multiple wireless base stations 100, wireless base stations 100 are existed together among which the distribution (alternatively, the division, which is hereinafter referred to as a split point of the base station signal processing) as the first signal processing and the second signal processing differs. When the split point of the base station signal processing differs, processing (for example, an endpoint), which is included in the first signal processing and the second signal process, or a type of data of a signal, which is transferred by the transfer path 101, differs.

In the present embodiment, the split point of the base station signal processing is set to differ by the wireless apparatus 110. For example, the processing that is included in the first signal processing is set to differ by the wireless apparatus 110. In this case, it is desirable for the wireless control apparatus 120 to set the processing (an endpoint of a protocol in the second signal processing) that is included in the second signal processing which is performed by the wireless control apparatus 120 itself, according to the split point of the base station signal processing that corresponds to the wireless apparatus 110 that is connected to the wireless control apparatus 120 itself. It is desirable for the wireless control apparatus 120 to set a method of transferring a signal to and from the wireless apparatus 110 through the transfer path 101, according to the split point of the base station signal processing that corresponds to the wireless apparatus 110 that is connected to the wireless control apparatus 120 itself.

In contrast, the wireless apparatus 110 transmits the configuration information relating to the first signal processing as described above, to the wireless control apparatus 120. Accordingly, it is possible that, based on the configuration information that is received from the wireless apparatus 110, the wireless control apparatus 120 sets the processing that is included in the second signal processing by the wireless control apparatus 120 itself, and the method of transferring a signal to and from the wireless apparatus 110. For this reason, for example, the wireless base station 100 can be applied in the mobile communication network, it is possible that the wireless apparatus 110 that has a different configuration (split point of the base station signal processing, or Function Split) is caused to be existed together.

The configuration information, for example, is information that possibly specifies the distribution of the base station signal processing as the first signal processing by the first processing unit 111 and the second signal processing by the second processing unit 122. Alternatively, the configuration information may be information that possibly specifies a transfer method for transferring a signal by the transfer path 101 between the wireless apparatus 110 and the wireless control apparatus 120, in accordance with the distribution of the base station signal processing as the first signal processing by the first processing unit 111 and the signal processing by the second processing unit 122.

As an example, the configuration information may be set to be information directly or indirectly indicating the split point of the base station signal processing to which the wireless apparatus 110 corresponds, or information (for example, the split point or a DU category that will be described below) relating to the split point. Alternatively, the configuration information may be set to be information indicating the processing that is included in the first signal processing, or information indicating the processing that is included in the second signal processing or information relating to the processing, in accordance with the split point of the base station signal processing to which the wireless apparatus 110. Alternatively, the configuration information may be information indicating a type of data of a signal that is to be transferred by the transfer path 101, or a method (for example, a protocol for) of transferring a signal that has such a type of data of the signal, or may be information relating to the transfer method.

The notification unit 124 notifies the wireless apparatus 110 of the configuration information relating to the second signal processing by the wireless control apparatus 120, which is in the base station signal processing, by the transfer path. However, the wireless control apparatus 120 may apply a configuration in which the notification unit 124 is omitted.

(Each Split Example of the Base Station Signal Processing According to the First Embodiment)

Figure 2:
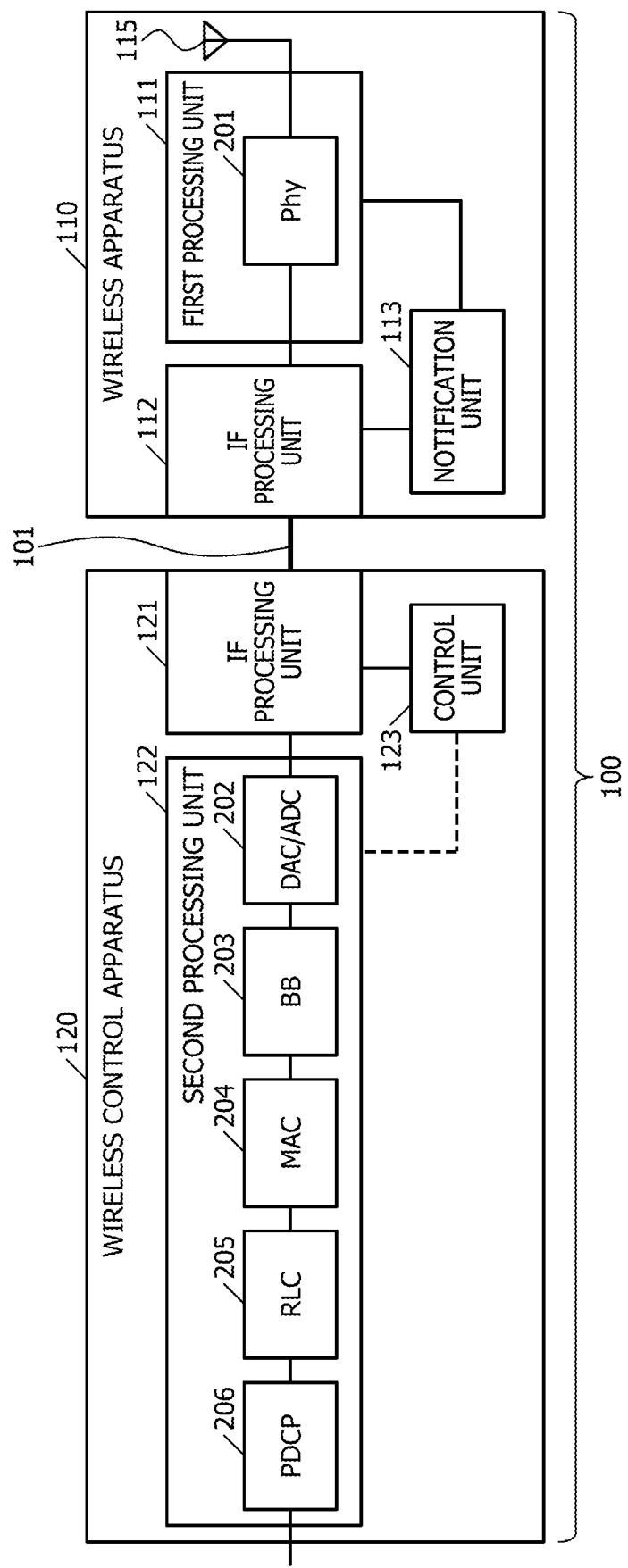
FIG. 2 is a diagram illustrating a first example of split of base station signal processing according to the first embodiment.

FIG. 2 is a diagram illustrating a first example of split of the base station signal processing according to the first embodiment. In FIG. 2, a portion that is the same as the portion that is illustrated in FIG. 1 is given the same reference numeral and a description thereof is omitted. In FIG. 2, an illustration of the notification unit 124 is omitted. In an example that is illustrated in FIG. 2, the wireless base station 100 includes a physical layer processing unit 201 (Phy), a DAC and ADC 202, a BB processing unit 203 (BB), a MAC processing unit 204 (MAC), an RLC processing unit 205 (RLC), and a PDCP processing unit 206 (PDCH). Each of these processing units is a processing unit that performs each processing that is included in the above-described base station signal processing. The split point of the base station signal processing described above, for example, is determined by how each of these processing units is distributed to the first processing unit 111 and the second processing unit 122. The above-described MAC, RLC, and PDCP indicate a configuration (a function) of a base station apparatus in a W-CDMA or LTE system in the related art, and descriptions are provided here using these. W-CDMA is short for Wideband-Code Division Multiple Access. W-CDMA is a registered trademark. There is a likelihood that the above-described function and a function of 5G mobile communication (commonly referred to as 5G) will differ from each other in name or functionality. However, the present embodiment is not limited to these.

DAC is short for Digital-to-Analog Converter. ADC is short for Analog-to-Digital Converter. BB is short for Base Band. MAC is short for Media Access Control. RLC is short for Radio Link Control. PDCP is short for Packet Data Convergence Protocol.

In an example that is illustrated in FIG. 2, a physical layer processing unit 201 is included in the first processing unit 111, and a DAC and ADC 202, a BB processing unit 203, a MAC processing unit 204, an RLC processing unit 205, and a PDCP processing unit 206 are included in the second processing unit 122. For example, the split point of the base station signal processing is between the physical layer processing unit 201 and the DAC and ADC 202.

The physical layer processing unit 201 performs physical layer reception processing on a signal that is received using the antenna 115, and outputs the signal on which the reception processing is performed, to the IF processing unit 112. The physical layer processing unit 201 performs physical layer transmission processing on the signal that is output from the IF processing unit 112, and wirelessly transmits the signal on which the transmission processing is performed, using the antenna 115.

The IF processing unit 112 transmits a signal that is output from the physical layer processing unit 201 to the wireless control apparatus 120 by the transfer path 101. The IF processing unit 112 outputs a signal that is transmitted from the wireless control apparatus 120 by the transfer path 101, to the physical layer processing unit 201.

The IF processing unit 121 outputs a signal that is transmitted from the wireless apparatus 110 by the transfer path 101, to the DAC and ADC 202. The IF processing unit 121 transmits a signal that is output from the DAC and ADC 202, to the wireless apparatus 110 by the transfer path 101.

The DAC and ADC 202 converts the signal that is output from the IF processing unit 121, from an analog signal to a digital signal, and outputs a signal that results from the conversion, to the BB processing unit 203. The DAC and ADC 202 converts a signal that is output from the BB processing unit 203, from a digital signal to an analog signal, and outputs a signal that results from the conversion, to the IF processing unit 121. The DAC and ADC 202 may be provided in the BB processing unit 203.

The BB processing unit 203 performs baseband reception processing on the signal that is output from the DAC and ADC 202, and outputs the signal on which the reception processing is performed, to the MAC processing unit 204. The BB processing unit 203 performs baseband transmission processing on the signal that is output from the MAC processing unit 204, and outputs the signal on which the transmission processing is performed, to the DAC and ADC 202. The reception processing by the BB processing unit 203, for example, includes demodulation, decoding, descrambling, FFT, or IFFT, or any combination thereof. FFT is short for Fast Fourier Transform. IFFT is short for Inverse Fast Fourier Transform. The transmission processing by the BB processing unit 203, for example, includes FFT, IFFT, coding, modulation, or scrambling, or any combination thereof. The transmission processing by the BB processing unit 203, for example, is specified in detail in TS 36.211, and is a technology that is well known to a person of ordinary skill in the art. No limitation to a description in which a portion of the processing that is specified in TS 36.211 is included and so on is imposed.

The MAC processing unit 204 performs MAC reception processing on a signal that is output from the BB processing unit 203, and outputs the signal on which the reception processing is performed, to the RLC processing unit 205. The MAC processing unit 204 performs MAC transmission processing on a signal that is output from the RLC processing unit 205, and outputs the signal on which the transmission processing is performed, to the BB processing unit 203. The detailed processing, for example, is specified in detail in TS 36.320, and is a technology that is well known to a person of ordinary skill in the art. For example, no limitation to a description in which a portion of the processing that is specified in TS 36.320 is included and so on is imposed.

The RLC processing unit 205 performs RLC reception processing on a signal that is output from the MAC processing unit 204, and outputs the signal on which the reception processing is performed, to the PDCP processing unit 206. Furthermore, the RLC processing unit 205 performs RLC transmission processing on a signal that is output from the PDCP processing unit 206, and outputs the signal on which the transmission processing is performed, to the MAC processing unit 204. The detailed processing, for example, is specified in detail in TS 36.321, and is a technology that is well known to a person of ordinary skill in the art. For example, no limitation to a description in which a portion of the processing that is specified in TS 36.321 is included and so on is imposed.

The PDCP processing unit 206 performs PDCP reception processing on a signal that is output from the RLC processing unit 205, and outputs the signal on which the reception processing is performed. A signal that is output from the PDCP processing unit 206, for example, is transmitted to a higher-layer apparatus in the wireless base station 100. The PDCP processing unit 206, for example, performs PDCP transmission processing on a signal that is transmitted from a higher-layer apparatus in the wireless base station 100, and outputs the signal on which the transmission processing is performed, to the RLC processing unit 205. The detailed processing, for example, is specified in detail in TS 36.322, and is a technology that is well known to a person of ordinary skill in the art. For example, no limitation to a description in which a portion of the processing that is specified in TS 36.321 is included and so on is imposed.

In the example that is illustrated in FIG. 2, the split point of the base station signal processing is between the physical layer processing unit 201 and the DAC and ADC 202, and thus a signal that is to be transferred by the transfer path 101, for example, is a DAC output or an ADC input, and is analog IQ data.

However, in a case where transfer by the IF processing units 112 and 121 by the transfer path 101 is digital transfer, the analog IQ data between the physical layer processing unit 201 and the DAC and ADC 202 is a DAC input or an ADC output, and is digitized, thereby being transferred by the transfer path 101.

For example, the IF processing unit 112 converts the analog IQ data that is output from the physical layer processing unit 201, into a digital signal, and transmits the digital signal to the wireless control apparatus 120 by the transfer path 101. On this occasion, the described-above digital signal is transferred in a state of being mapped onto a format that is determined by a protocol. Furthermore, the IF processing unit 112 converts the digital signal that is transmitted from the wireless control apparatus 120 by the transfer path 101, into analog IQ data, and outputs the analog IQ data to the physical layer processing unit 201. On this occasion, the digital signal that is transmitted in the state of being mapped onto the above-described format is digitized for reception.

The IF processing unit 121 converts the digital signal that is transmitted from the wireless apparatus 110 by the transfer path 101, into a digital signal, and outputs the digital signal to the DAC and ADC 202. On this occasion, the digital signal that is transmitted in the state of being mapped onto the above-described format is digitized for reception. The IF processing unit 121 converts the analog IQ data that output from the DAC and ADC 202, into a digital signal, and transmits the digital signal to the wireless apparatus 110 by the transfer path 101. On this occasion, the described-above digital signal is transferred in a state of being mapped onto a format that is determined by a protocol.

Figure 3:
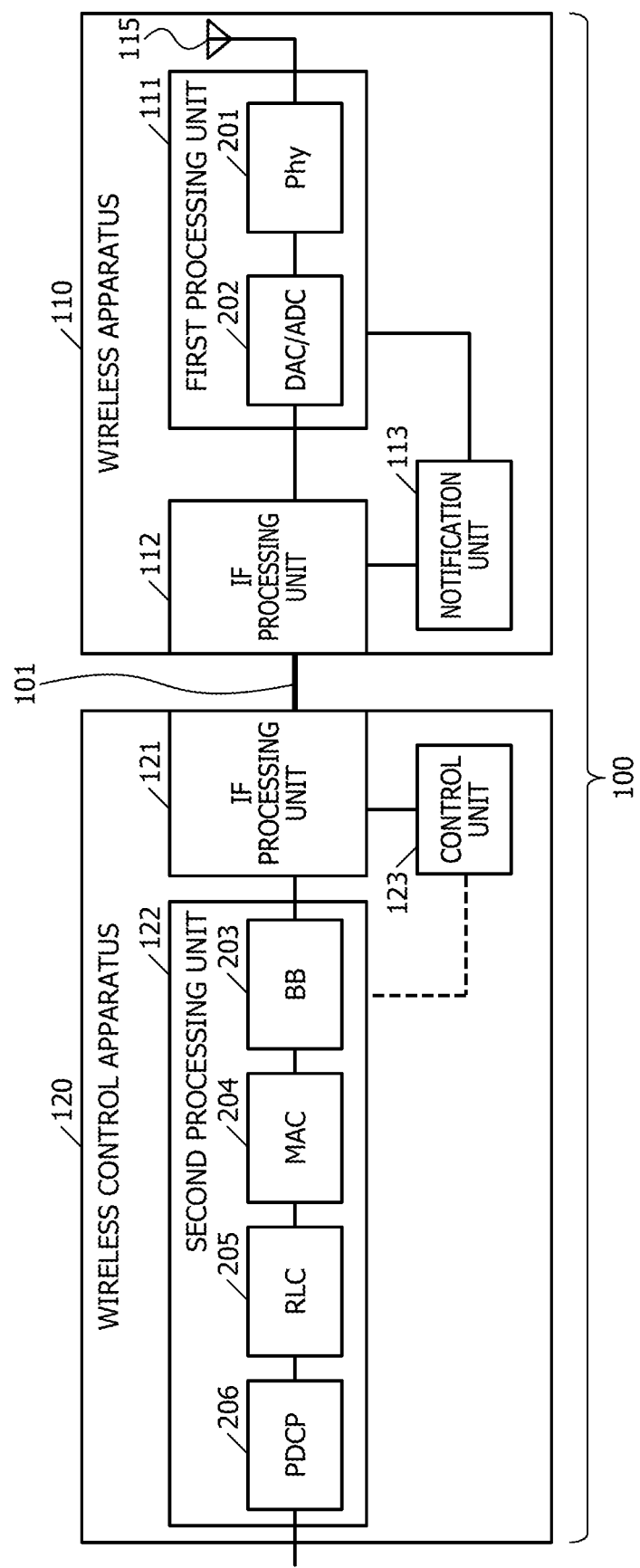
FIG. 3 is a diagram illustrating a second example of the split of the base station signal processing according to the first embodiment.

FIG. 3 is a diagram illustrating a second example of the split of the base station signal processing according to the first embodiment. In FIG. 3, a portion that is the same as the portion that is illustrated in FIG. 2 is given the same reference numeral and a description thereof is omitted. In an example that is illustrated in FIG. 3, the physical layer processing unit 201 and the DAC and ADC 202 are included in the first processing unit 111, and the BB processing unit 203, the MAC processing unit 204, the RLC processing unit 205, and the PDCP processing unit 206 are included in the second processing unit 122. That is, the split point of the base station signal processing is between the DAC and ADC 202 and the BB processing unit 203.

The physical layer processing unit 201 performs the physical layer reception processing on the signal that is received using the antenna 115, and outputs the signal on which the reception processing is performed, to the DAC and ADC 202. The physical layer processing unit 201 performs the physical layer transmission processing on the signal that is output from the DAC/ADC 202, and outputs the signal on which the transmission processing is performed, using the antenna 115.

The DAC and ADC 202 converts the signal that is output from the physical layer processing unit 201, from an analog signal to a digital signal, and outputs a signal that results from the conversion, to the IF processing unit 112. The DAC and ADC 202 converts the signal that is output from the IF processing unit 112, from a digital signal to an analog signal, and outputs a signal that results from the conversion, to the physical layer processing unit 201.

The IF processing unit 112 transmits the signal that is output from the DAC and ADC 202, to the wireless control apparatus 120, by the transfer path 101. The IF processing unit 112 outputs the signal that is transmitted from the wireless control apparatus 120 by the transfer path 101, to the DAC and ADC 202.

The IF processing unit 121 outputs the signal that is output from the wireless apparatus 110 by the transfer path 101, to the BB processing unit 203. The IF processing unit 121 transmits the signal that is output from the BB processing unit 203, to the wireless apparatus 110 by the transfer path 101.

The BB processing unit 203 performs the baseband reception processing on the signal that is output from the IF processing unit 121, and outputs the signal on which the reception processing is performed, the MAC processing unit 204. The BB processing unit 203 performs the baseband transmission processing on the signal that is output from the MAC processing unit 204, and outputs the signal on which the transmission processing is performed, to the IF processing unit 121.

In an example that is illustrated in FIG. 3, the split point of the base station signal processing is between the DAC and ADC 202 and the BB processing unit 203, and thus the signal that is to be transferred by the transfer path 101 is the IQ data of the digital signal.

Figure 4:
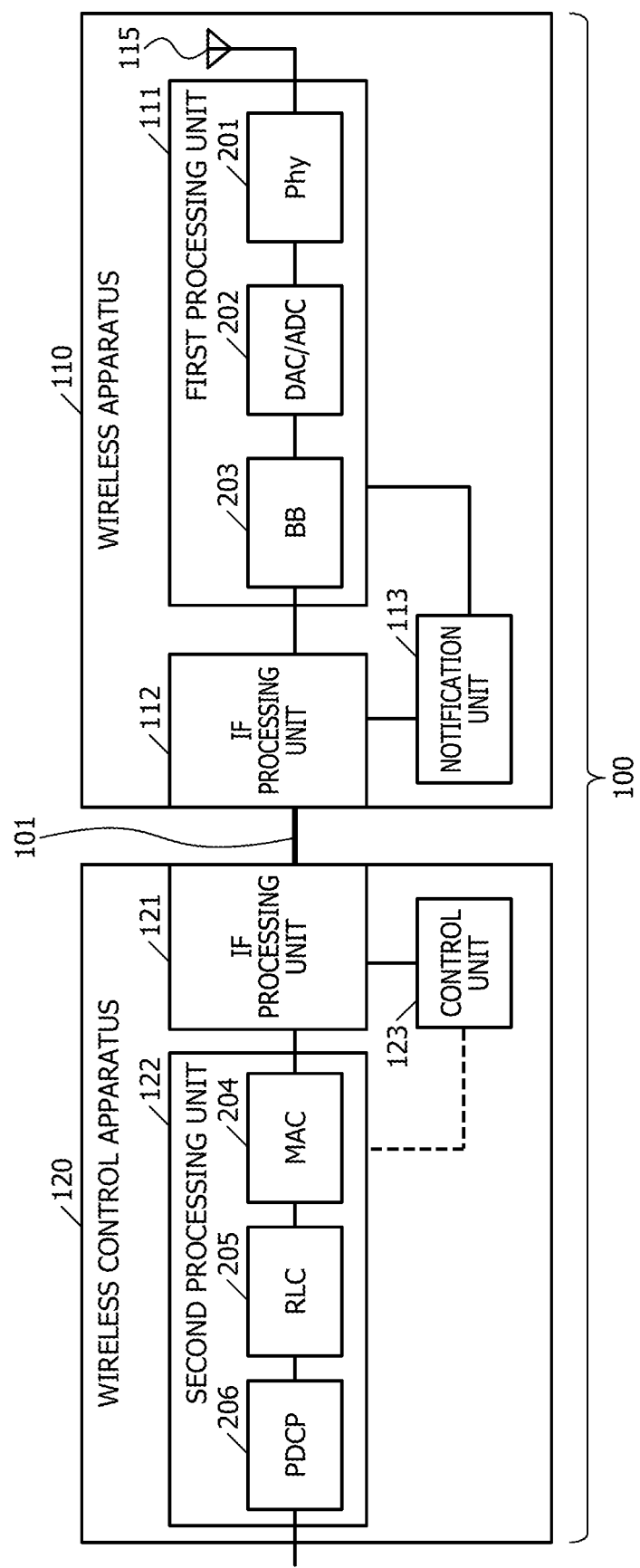
FIG. 4 is a diagram illustrating a third example of the split of the base station signal processing according to the first embodiment.

FIG. 4 is a diagram illustrating a third example of the split of the base station signal processing according to the first embodiment. In FIG. 4, a portion that is the same as the portion that is illustrated in FIG. 3 is given the same numeral reference, and a description thereof is omitted. In an example that is illustrated in FIG. 4, the physical layer processing unit 201, the DAC and ADC 202, and the BB processing unit 203 are included in the first processing unit 111, and the MAC processing unit 204, the RLC processing unit 205, and the PDCP processing unit 206 are included in the second processing unit 122. For example, the split point of the base station signal processing is between the BB processing unit 203 and the MAC processing unit 204.

The DAC and ADC 202 converts the signal that is output from the physical layer processing unit 201, from an analog signal to a digital signal, and outputs a signal that results from the conversion, to the BB processing unit 203. The DAC and ADC 202 converts the signal that is output from the BB processing unit 203, from a digital signal to an analog signal, and outputs a signal that results from the conversion, to the physical layer processing unit 201.

The BB processing unit 203 performs the baseband reception processing on the signal that is output from the DAC and ADC 202, and outputs the signal on which the reception processing is performed, to the IF processing unit 112. The BB processing unit 203 performs the baseband transmission processing on the signal that is output from the IF processing unit 112, and outputs the signal on which the transmission processing is performed, to the DAC and ADC 202.

The IF processing unit 112 transmits the signal that is output from the BB processing unit 203, to the wireless control apparatus 120 by the transfer path 101. The IF processing unit 112 outputs the signal that is transmitted from the wireless control apparatus 120 by the transfer path 101, to the BB processing unit 203.

The IF processing unit 121 outputs the signal that is transmitted from the wireless apparatus 110 by the transfer path 101, to the MAC processing unit 204. The IF processing unit 121 transmits the signal that is output from the MAC processing unit 204, to the wireless apparatus 110 by the transfer path 101.

In the example that is illustrated in FIG. 4, the split point of the base station signal processing is between the BB processing unit 203 and the MAC processing unit 204, and thus the signal that is to be transferred by the transfer path 101, for example, is a MAC PDU. PDU is short for Protocol Data Unit. The MAC PDU, for example, is a digital signal that is one bit long.

Figure 5:
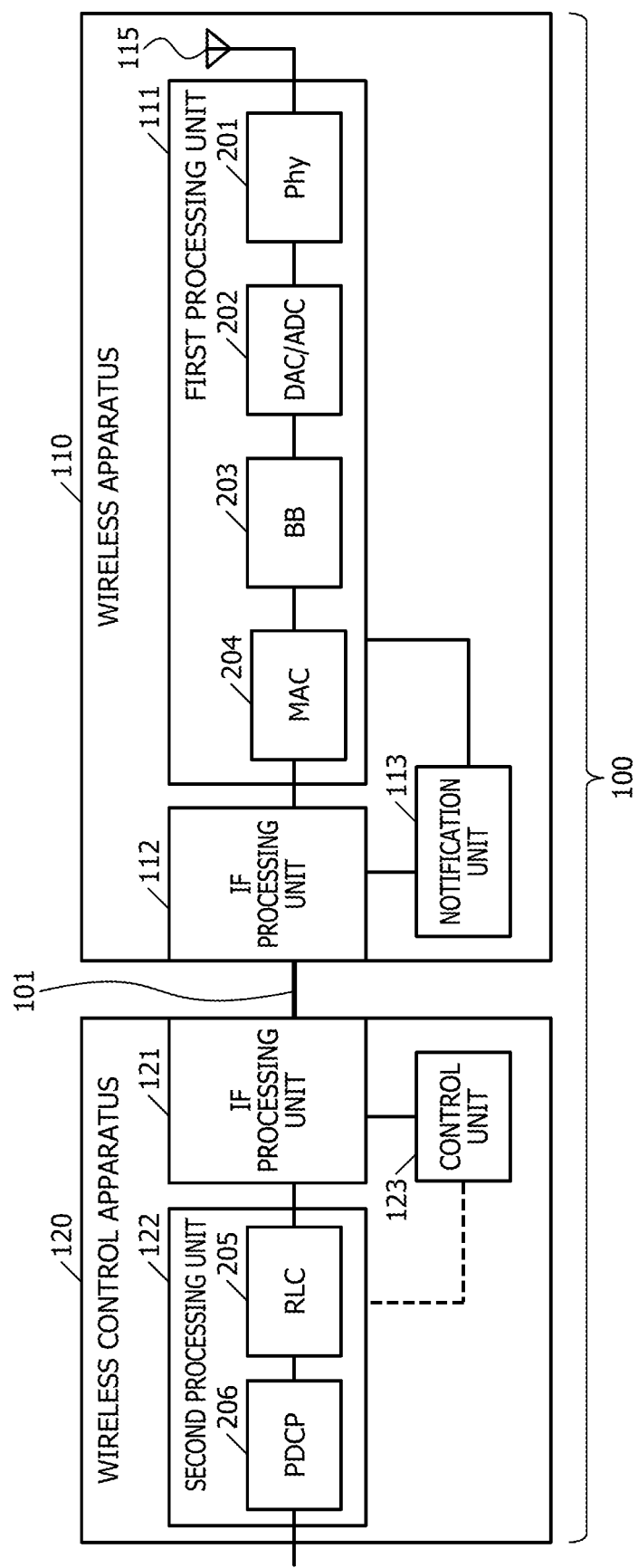
FIG. 5 is a diagram illustrating a fourth example of the split of the base station signal processing according to the first embodiment.

FIG. 5 is a diagram illustrating a fourth example of the split of the base station signal processing according to the first embodiment. In FIG. 5, a portion that is the same as the portion that is illustrated in FIG. 4 is given the same numeral reference, and a description thereof is omitted. In an example that is illustrated in FIG. 5, the physical layer processing unit 201, the DAC and ADC 202, the BB processing unit 203, and the MAC processing unit 204 are included in the first processing unit 111, and the RLC processing unit 205 and the PDCP processing unit 206 are included in the second processing unit 122. For example, the split point of the base station signal processing is between the MAC processing unit 204 and the RLC processing unit 205.

The BB processing unit 203 performs baseband reception processing on the signal that is output from the DAC and ADC 202, and outputs the signal on which the reception processing is performed, to the MAC processing unit 204. The BB processing unit 203 performs baseband transmission processing on the signal that is output from the MAC processing unit 204, and outputs the signal on which the transmission processing is performed, to the DAC and ADC 202.

The MAC processing unit 204 performs the MAC reception processing on the signal that is output from the BB processing unit 203, and outputs the signal on which the reception processing is performed, to the IF processing unit 112. The MAC processing unit 204 performs the MAC transmission processing on the signal that is output from the IF processing unit 112, and outputs the signal on which the transmission processing is performed, to the BB processing unit 203.

The IF processing unit 112 transmits the signal that is output from the MAC processing unit 204 to the wireless control apparatus 120 by the transfer path 101. The IF processing unit 112 outputs the signal that is transmitted from the wireless control apparatus 120 by the transfer path 101, to the MAC processing unit 204.

The IF processing unit 121 outputs the signal that is transmitted from the wireless apparatus 110 by the transfer path 101, to the RLC processing unit 205. The IF processing unit 121 transmits the signal that is output from the RLC processing unit 205, to the wireless apparatus 110 by the transfer path 101.

In the example that is illustrated in FIG. 5, the split point of the base station signal processing is between the MAC processing unit 204 and the RLC processing unit 205, and thus, the signal that is to be transferred by the transfer path 101, for example, is an RLC PDU.

Figure 6:
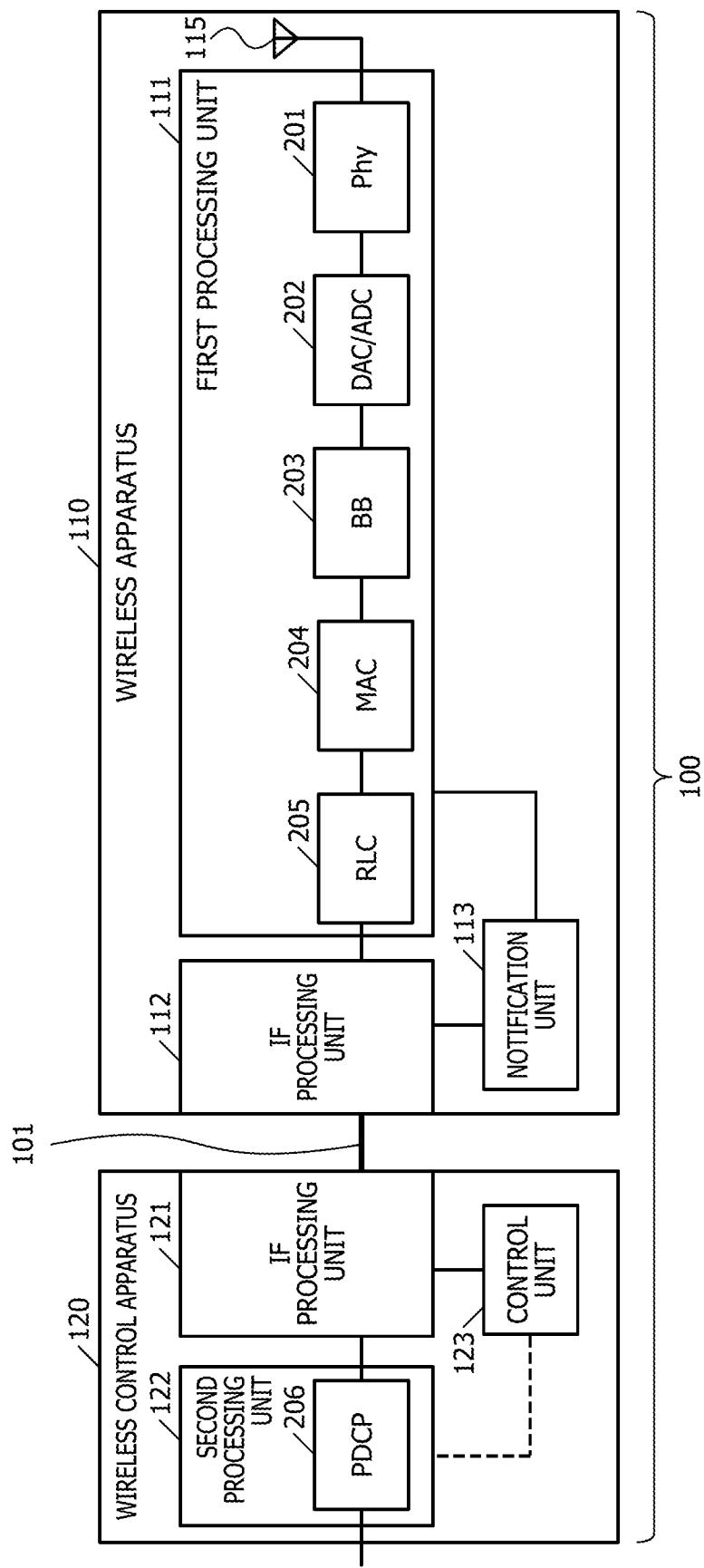
FIG. 6 is a diagram illustrating a fifth example of the split of the base station signal processing according to the first embodiment.

FIG. 6 is a diagram illustrating a fifth example of the split of the base station signal processing according to the first embodiment. In FIG. 6, a portion that is the same as the portion that is illustrated in FIG. 5 is given the same numeral reference, and a description thereof is omitted. In an example that is illustrated in FIG. 6, the physical layer processing unit 201, the DAC and ADC 202, the BB processing unit 203, the MAC processing unit 204, and the RLC processing unit 205 are included in the first processing unit 111, and the PDCP processing unit 206 is included in the second processing unit 122. For example, the split point of the base station signal processing is between the RLC processing unit 205 and the PDCP processing unit 206.

The MAC processing unit 204 performs the MAC reception processing on the signal that is output from the BB processing unit 203, and outputs the signal on which the reception processing is performed, to the RLC processing unit 205. The MAC processing unit 204 performs the MAC transmission processing on the signal that is output from the RLC processing unit 205, and outputs the signal on which the transmission processing is performed, to the BB processing unit 203.

The RLC processing unit 205 performs the RLC reception processing on the signal that is output from the MAC processing unit 204, and outputs the signal on which the reception processing is performed, to the IF processing unit 112. The RLC processing unit 205 performs the RLC transmission processing on the signal that is output from the IF processing unit 112, and outputs the signal on which the transmission processing is performed, to the MAC processing unit 204.

The IF processing unit 112 transmits the signal that is output from the RLC processing unit 205 to the wireless control apparatus 120 by the transfer path 101. The IF processing unit 112 outputs the signal that is transmitted from the wireless control apparatus 120 by the transfer path 101, to the RLC processing unit 205.

The IF processing unit 121 outputs the signal that is transmitted from the wireless apparatus 110 the PDCP by the transfer path 101, to the processing unit 206. The IF processing unit 121 transmits the signal that is output from the PDCP processing unit 206 to the wireless apparatus 110 by the transfer path 101.

The PDCP processing unit 206 performs the PDCP reception processing on the signal that is output from the IF processing unit 121, and transmits the signal on which the reception processing is performed, to a higher-layer apparatus in the wireless base station 100. The PDCP processing unit 206 performs the PDCP transmission processing on a signal that is transmitted from a higher-layer apparatus in the wireless base station 100, and outputs the signal on which the transmission processing is performed, to the IF processing unit 121.

In the example that is illustrated in FIG. 6, the split point of the base station signal processing is between the RLC processing unit 205 and the PDCP processing unit 206, and thus, the signal that is to be transferred by the transfer path 101, for example, is a PDCP PDU.

As an example, the wireless base station 100 can be applied in the mobile communication network, the wireless base stations 100 are existed together among which the split point of the base station signal processing that is illustrated in FIGS. 2 to 6 differs. However, in the mobile communication network in which the wireless base station 100 may be applied, multiple wireless base stations 100, which are a portion of the wireless base stations 100 that are illustrated in FIGS. 2 to 6, are existed together. The wireless base station 100 may be applied in the mobile communication network, in the examples that are illustrated in FIGS. 2 to 6, wireless base stations 100 may be existed together among which the split point of the base station signal processing differs.

For example, in a case where it is possible that MAC processing is divided into two processing operations in conversion units of the PDU and the SDU, the MAC processing unit 204 may be divided into two MAC processing units, and the split point of the base station signal processing may be between the two MAC processing units that result from the division. In this case, as an example, the signal that is to be transferred by the transfer path 101 is a MAC SDU. SDU is short for Service Data Unit. Of the two MACs that result from the division, one on the RLC side may be referred to as a higher-layer MAC (Higher MAC) and the other one on the BB side may be referred to as a lower-layer MAC (Lower MAC).

In a case where it is possible that RLC processing is divided into two processing operations in the conversion units of the PDU and the SDU, the RLC processing unit 205 may be divided into two RLC processing units, and the split point of the base station signal processing may be between the two MAC RLC units that result from the division. In this case, as an example, the signal that is to be transferred by the transfer path 101 is an RLC SDU. Of the two RLCs that result from the division, one on the PDCP side may be referred to as a higher-layer RLC (Higher RLC), and the other one on the RLC side may be referred to as a lower-layer RLC (Lower RLC).

In a case where it is possible that PDCP processing is divided into two processing operations in the conversion units of the PDU and the SDU, the PDCP processing unit 206 may be divided into two PDCP processing units, and the split point of the base station signal processing may be between the two PDCP processing units 206 that result from the division. In this case, as an example, the signal that is to be transferred by the transfer path 101 is a PDCP SDU. Of the two PDCPs that result from the division, one on the MME or SGW side may be referred to as a higher-layer PDCP (Higher PDCP) and the other one on the RLC side may be a lower-layer PDCP (Lower PDCP).

If a Radio Frequency (RF) (high frequency) processing unit is present between the antenna 115 and the physical layer processing unit 201, the split point of the base station signal processing may be between the RF processing unit and the physical layer processing unit 201.

The base station signal processing in the wireless base station 100 is not limited to the examples that are illustrated in FIGS. 2 to 6, and may be changed according to a communication scheme for the wireless base station 100. For example, the physical layer processing, the BB processing, the MAC processing, the RLC processing, and PDCP processing, as in the examples that are illustrated in FIGS. 2 to 6, are included in the base station signal processing in a 4G mobile communication network, but there is a likelihood that base station signal processing in a 5G mobile communication network will differ from the processing described above. For example, the base station signal processing in the wireless base station 100 may be multiple processing operations that are serially performed by the wireless base station 100 on a signal which is to be transferred by the base station 100. Specifically, for example, deletion of one or several functions is possible such as deletion of the RLC by an integral combination of the RLC with the MAC and/or the PDCP. It is also possible that a new function is added.

(Configuration in which Different Wireless Apparatuses are Caused to be Existed Together in the Wireless Base Station According to the First Embodiment)

Figure 7:
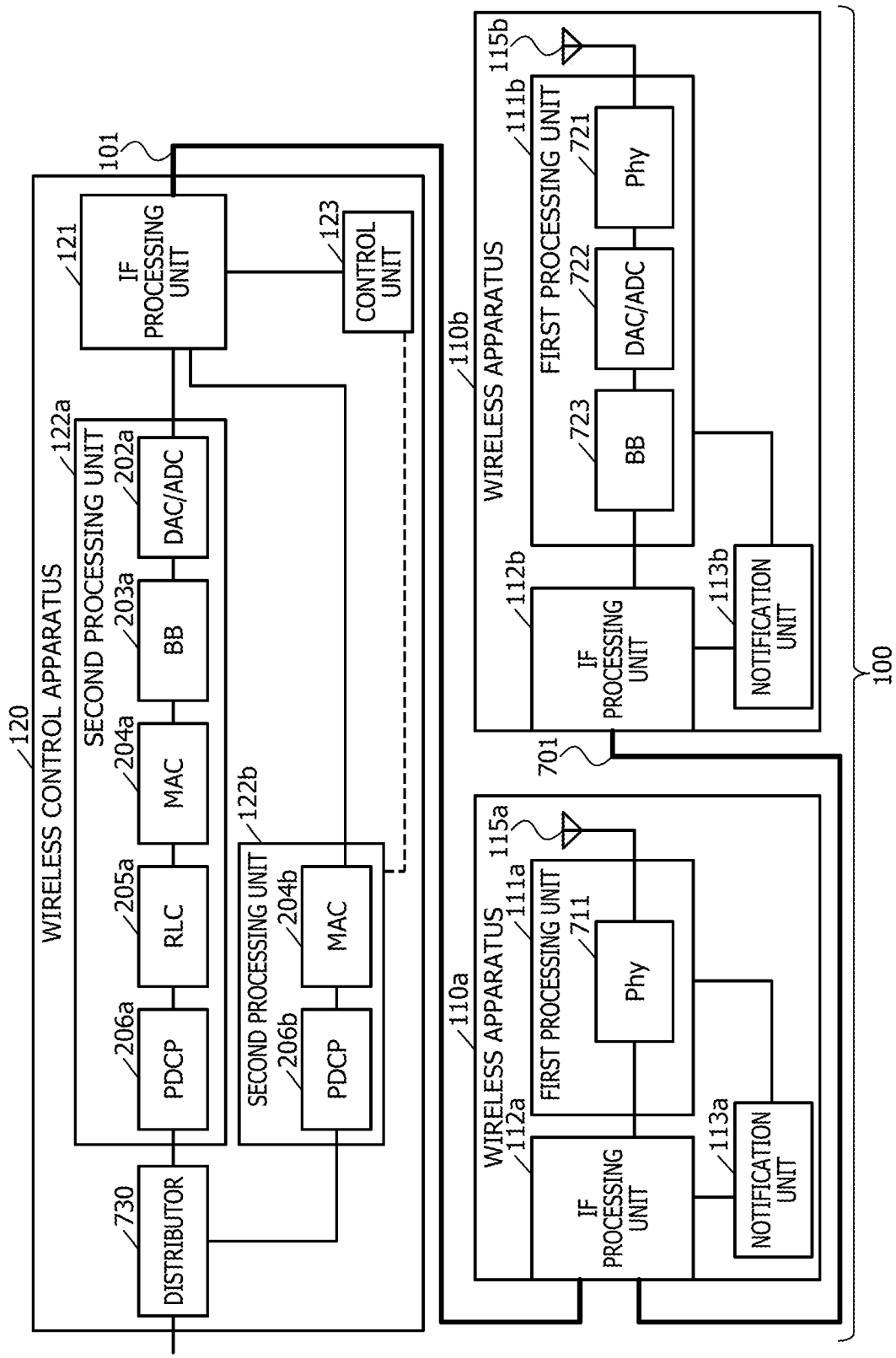
FIG. 7 is a diagram illustrating an example of a configuration in which different wireless apparatuses are existed together in the wireless base station according to the first embodiment.

FIG. 7 is a diagram illustrating an example of a configuration in which different wireless apparatuses are existed together in the wireless base station according to the first embodiment. In FIG. 7, a portion that is the same as the portions that are illustrated in FIGS. 2 to 8 is given the same reference numeral and a description thereof is omitted. As illustrated in FIG. 7, as wireless apparatuses 110 in one wireless base station 100, multiple wireless apparatuses 110, each of which performs different processing which is included in the first signal processing, may be caused to be existed together. For example, in an example that is illustrated in FIG. 7, a wireless apparatus 110a and the wireless apparatus 110b, as the wireless apparatuses 110, are connected in a cascade topology to the wireless control apparatus 120.

For example, the wireless apparatus 110a is the wireless apparatus 110 (a first wireless apparatus) that corresponds to 4G Remote Radio Head (RRH). The wireless apparatus 110a includes a first processing unit 111a, an IF processing unit 112a, a notification unit 113a, and an antenna 115a. The first processing unit 111a, the IF processing unit 112a, the notification unit 113a, and the antenna 115a have the same configurations, respectively, than the first processing unit 111, the IF processing unit 112, the notification unit 113, and the antenna 115 of the wireless apparatus 110.

However, the first processing unit 111a, for example, has the same configuration as the first processing unit 111 that is illustrated in FIG. 2. For example, a physical layer processing unit 711 (Phy) is included, as the processing unit that performs the first signal processing, in the first processing unit 111a. The physical layer processing unit 711 has the same configuration as the physical layer processing unit 201 that is illustrated in FIG. 2.

The IF processing unit 112a of the wireless apparatus 110a relays transfer of a signal between the wireless apparatus 110b and the wireless control apparatus 120, which will be described below. The notification unit 113a of the wireless apparatus 110a transmits the configuration information relating to the first signal processing by the first processing unit 111a to the wireless control apparatus 120 through the IF processing unit 112a.

The wireless apparatus 110b is the wireless apparatus 110 (a second wireless apparatus) that corresponds to 5G Radio Equipment (RE). The wireless apparatus 110b includes a first processing unit 111b, an IF processing unit 112b, a notification unit 113b, and an antenna 115b. The first processing unit 111b, the IF processing unit 112b, the notification unit 113b, and the antenna 115b have the configurations, respectively, than the first processing unit 111, the IF processing unit 112, the notification unit 113, and the antenna 115 of the wireless apparatus 110.

However, the first processing unit 111b, for example, has the same configuration as the first processing unit 111 that is illustrated in FIG. 4. For example, a physical layer processing unit 721 (Phy), a DAC and ADC 722, and a BB processing unit 723 (BB) are included, as the processing units that perform the first signal processing, in the first processing unit 111b. The physical layer processing unit 721, the DAC and ADC 722, and the BB processing unit 723, for example, have the same configurations, respectively, than the physical layer processing unit 201, the DAC and ADC 202, and the BB processing unit 203 that are illustrated in FIG. 4.

The IF processing unit 112b of the wireless apparatus 110b is connected to the IF processing unit 112a of the wireless apparatus 110a through a transfer path 701, and thus is connected to the wireless control apparatus 120 through the wireless apparatus 110a. For example, a signal between the wireless control apparatus 120 and the wireless apparatus 110b is transferred through the transfer path 101, the IF processing unit 112a, and the transfer path 701.

The notification unit 113b of the wireless apparatus 110b transmits the configuration information relating to the first signal processing by the first processing unit 111b through the IF processing unit 112b. The configuration information that is transmitted from the notification unit 113b through the IF processing unit 112b is transmitted to the wireless control apparatus 120 through the transfer path 701, the IF processing unit 112a, and the transfer path 101.

The IF processing unit 121 of the wireless control apparatus 120 outputs each of the pieces of configuration information that are transmitted from the wireless apparatuses 110a and 110b, to the control unit 123. Based on the configuration information from the wireless apparatus 110a, which is output from the IF processing unit 121, the control unit 123 sets a second processing unit 122a that performs communication with the wireless apparatus 110a. Based on the configuration information from the wireless apparatus 110b, which is output from the IF processing unit 121, the control unit 123 sets a second processing unit 122b that performs communication with the wireless apparatus 110b.

The second processing unit 122a, for example, has the same configuration as the second processing unit 122 that is illustrated in FIG. 2. For example, the second processing unit 122a includes a DAC and ADC 202a, a BB processing unit 203a, a MAC processing unit 204a, an RLC processing unit 205a, and a PDCP processing unit 206a. The DAC and ADC 202a and the BB processing unit 203a, for example, have the same configurations, respectively, than the DAC and ADC 202 and the BB processing unit 203 that are illustrated in FIG. 2. The MAC processing unit 204a, the RLC processing unit 205a, and the PDCP processing unit 206a, for example, have the same configurations, respectively, than the MAC processing unit 204, the RLC processing unit 205, and the PDCP processing unit 206 that are illustrated in FIG. 2. Therefore, with the first processing unit 111a and the second processing unit 122a, the same function as that of the wireless base station 100 that is illustrated in FIG. 2 is realized.

The second processing unit 122b, for example, is the same as the second processing unit 122 that is illustrated in FIG. 4. For example, the second processing unit 122b includes a MAC processing unit 204b and a PDCP processing unit 206b. The MAC processing unit 204b and the PDCP processing unit 206b, for example, are the same as the MAC processing unit 204 and the PDCP processing unit 206, respectively, that are illustrated in FIG. 4. Therefore, with the first processing unit 111b and the second processing unit 122b, the same function as that of the wireless base station 100 that is illustrated in FIG. 2 is realized. However, in the example that is illustrated in FIG. 7, processing that is equivalent to the RLC processing unit 205 that is illustrated in FIG. 4 is not included in the second processing unit 122b. For example, in 3GPP, it is also studied that the RLC processing between MAC and PDCP is omitted in this manner in 5G.

Subsequently, transfer of the downlink signal that is received by the wireless base station 100 from a higher-layer apparatus and is transmitted to the wireless terminal will be described. A distribution unit 730 is provided in the wireless control apparatus 120 that is illustrated in FIG. 7. The distribution unit 730 outputs a signal that has to be wirelessly transmitted by the wireless apparatus 110a, of signals that are transmitted from higher-layer apparatuses in the wireless base station 100, to the second processing unit 122a. The distribution unit 730 outputs a signal that has to be wirelessly transmitted by the wireless apparatus 110b, of the signals that are transmitted from higher-layer apparatuses in the wireless base station 100, to the second processing unit 122b.

The second processing unit 122a performs the second signal processing by the second processing unit 122a on a signal that is output from the distribution unit 730, and outputs the signal on which the second signal processing is performed, to the IF processing unit 121. At this time, the second processing unit 122a may add a destination indicating the wireless apparatus 110a and identification information in accordance with the processing that is included in the first signal processing by the wireless apparatus 110a, to a signal that is to be output to the IF processing unit 121. The identification information, for example, is information that possibly specifies a transfer method for transferring a signal (for example, the analog IQ data) that is output by the second processing unit 122a, by the transfer path 101.

The second processing unit 122b performs the second signal processing by the second processing unit 122b on the signal that is output from the distribution unit 730, and outputs the signal on which the second signal processing, to the IF processing unit 121. At this time, the second processing unit 122b adds a destination indicating the wireless apparatus 110b and identification information in accordance with the processing that is included in the first signal processing by the wireless apparatus 110b, to a signal that is output to the IF processing unit 121. The identification information is information that possibly specifies a transfer method for transferring a signal (for example, the MAC PDU) that is output by the second processing unit 122b, by the transfer path 101.

The IF processing unit 121 transmits signals that are output from the second processing units 122a and 122b, to the wireless apparatus 110a through the transfer path 101. At this time, based on the identification information that is added to the signal from the second processing unit 122a, the IF processing unit 121 specifies a transfer method (for example, a protocol) for transferring the signal (for example, the analog IQ data) by the transfer path 101. Then the IF processing unit 121 transmits the signal from the second processing unit 122a to the wireless apparatus 110a by the transfer path 101, using the specified transfer method.

Based on the identification information that is added to the signal from the second processing unit 122b, the IF processing unit 121 specifies a transfer method (for example, a new transfer method) for transferring the signal (for example, the MAC PDU) by the transfer path 101. The IF processing unit 121 transmits the signal from the second processing unit 122b to the wireless apparatus 110a by the transfer path 101 using the specified transfer method.

Regarding the signal that is transmitted from the wireless control apparatus 120 by the transfer path 101, the IF processing unit 112a of the wireless apparatus 110a specifies a method of transferring the signal, based on the identification information that is added to the signal, and receives the signal using the specified transfer method. The IF processing unit 112a outputs a signal of which a destination is the wireless apparatus 110a, of the received signals, to the first processing unit 111a, and transmits a signal of which a destination is the wireless apparatus 110b, of the received signals, to the wireless apparatus 110b by the transfer path 701. The first processing unit 111a performs the first signal processing by the wireless apparatus 110a itself on a signal that is output from the IF processing unit 112a, and thus wirelessly transmits the signal.

The IF processing unit 112b of the wireless apparatus 110b receives the signal that is transmitted from the wireless apparatus 110a by the transfer path 701. At this time, the IF processing unit 112b may receive the signal using the transfer method that is specified based on the identification information that is added to the signal which is transmitted from the wireless apparatus 110a by the transfer path 701. The IF processing unit 112b outputs the received signal to the first processing unit 111b. The first processing unit 111b performs the first signal processing by the wireless apparatus 110b itself on the signal that is output from the IF processing unit 112b, and thus wirelessly transmits the signal.

Subsequently, transfer of the uplink signal that is received by the wireless base station 100 from the wireless terminal and is transmitted to a higher-layer apparatus will be described. The first processing unit 111b of the wireless apparatus 110b performs the first signal procession by the wireless apparatus 110b itself on the signal that is wirelessly received, and outputs the signal on which the first signal processing is performed, to the IF processing unit 112b. At this time, the first processing unit 111b adds a destination indicating the second processing unit 122b of the wireless control apparatus 120 and the identification information in accordance with the processing that is included in the first signal processing by the wireless apparatus 110b, to a signal that is output to the IF processing unit 112b. The identification information is identification information that possibly specifies a transfer method for transferring a signal (for example, the MAC PDU) that is output by the first processing unit 111b, by the transfer path 101.

The IF processing unit 112b transmits a signal that is output from the first processing unit 111b, to the wireless apparatus 110a by the transfer path 701. At this time, the IF processing unit 112b may transmit the signal using a transfer method that is specified with the identification information which is added to the signal that is output from the first processing unit 111b.

The first processing unit 111a of the wireless apparatus 110a performs the first signal processing by the wireless apparatus 110a itself on the signal that is wirelessly received, and outputs the signal on which the first signal processing is performed, to the IF processing unit 112a. At this time, the first processing unit 111a adds a destination indicating the second processing unit 122a of the wireless control apparatus 120, and the identification information in accordance with the processing that is included in the first signal processing by the wireless apparatus 110a, to a signal that is output from the IF processing unit 112a. The identification information is identification information that possibly specifies a transfer method for transferring a signal (for example, the analog IQ data) that is output by the first processing unit 111a, by the transfer path 101.

The IF processing unit 112a receives a signal that is transmitted from the wireless apparatus 110b by the transfer path 701. At this time, the IF processing unit 112a may receive the signal using the transfer method that is specified based on the identification information that is added to the signal which is transmitted from the wireless apparatus 110b by the transfer path 701. The IF processing unit 112a transmits the signal to the wireless control apparatus 120 by the transfer path 101 using the transfer method that is specified based on the identification information that is added to the signal that is received from the wireless apparatus 110b. The IF processing unit 112a transmits the signal to the wireless control apparatus 120 by the transfer path 101 using the transfer method that is specified based on the identification information which is added to the signal that is output from the first processing unit 111a.

The IF processing unit 121 of the wireless control apparatus 120 receives the signal using the transfer method that is specified based on the identification information that is added to the signal which is transmitted from the wireless apparatus 110a by the transfer path 101. The IF processing unit 121 outputs the signal from the wireless apparatus 110a, of which a destination is the second processing unit 122a, of the received signals, to the second processing unit 122a. The IF processing unit 121 outputs the signal from the wireless apparatus 110b, of which a destination is the second processing unit 122b, of the received signals, to the second processing unit 122b.

The second processing unit 122a performs the second signal processing by the second processing unit 122a on the signal that is output from the IF processing unit 121, and outputs the signal on which the second signal processing is performed, to the distribution unit 730. The second processing unit 122b performs the second signal processing by the second processing unit 122b on the signal that is output from the IF processing unit 121, and outputs the signal on which the second signal processing is performed, to the distribution unit 730. The distribution unit 730 transmits each of the signals that are output from the second processing units 122a and 122b, to a higher-layer apparatus in the wireless base station 100.

Subsequently, the identification information will be described. The identification information, for example, may be defined as the same as the configuration information described above. For example, the identification information is information that possibly specifies the distribution (alternatively, function division) of the base station signal processing as the first signal processing by the first processing unit 111 and the second signal processing by the second processing unit 122. Alternatively, the identification information may be information that possibly specifies the transfer method for transferring the signal by the transfer path 101 between the wireless apparatus 110 and the wireless control apparatus 120, in accordance with the distribution of the base station signal processing as the first signal processing by the first processing unit 111 and the second signal processing by the second processing unit 122.

As an example, the identification information may be defined as information indicating directly or indirectly the split point of the base station signal processing to which the wireless apparatus 110 corresponds, or information (for example, the split point or the DU category that will be described below) relating to the split point. Alternatively, the identification information may be information indicating the processing that is included in the first signal processing, information indicating the processing that is included in the second signal processing, or information relating to the processing, in accordance with the split point of the base station signal processing to which the wireless apparatus 110 corresponds. Alternatively, the identification information may be set to be information indicating a type of data of a signal that is to be transferred by the transfer path 101, or a method (for example, a protocol for) of transferring a signal that has such a type of data of the signal, or may be information relating to the transfer method.

A configuration is described in which one IF processing unit 112a that is provided in the wireless apparatus 110a is connected to the wireless control apparatus 120 and the wireless apparatus 110a, but no limitation to this configuration is imposed. For example, a configuration may be applied in which two IF processing units 112a are provided in the wireless apparatus 110a and in which two IF processing units 112a are connected to the wireless control apparatus 120 and the wireless apparatus 110a, respectively. In this case, the signal between the wireless apparatus 110b and the wireless control apparatus 120 is transferred between two IF processing units 112a.

A configuration is described in which the wireless apparatuses 110a and 110b are connected in the cascade topology, as the wireless base stations 100, to the wireless control apparatus 120, but a configuration may be applied in which three or more wireless base stations 100 are connected in the cascade topology to the wireless control apparatus 120. The split point of the base station signal processing to which each of the wireless apparatuses 110 that is connected to the wireless control apparatus 120 corresponds may be changed in many ways without being limited to the example that is illustrated in FIG. 7.

With a configuration that is illustrated in FIG. 7, a signal between the wireless control apparatus 120 and the wireless apparatus 110a, and the signal between the wireless control apparatus 120 and the wireless apparatus 110b may be transmitted by the same transfer path 101. The wireless control apparatus 120 may collectively transfer the signal between the wireless control apparatus 120 and the wireless apparatus 110a and the signal between the wireless control apparatus 120 and the wireless apparatus 110b.

Figure 8:
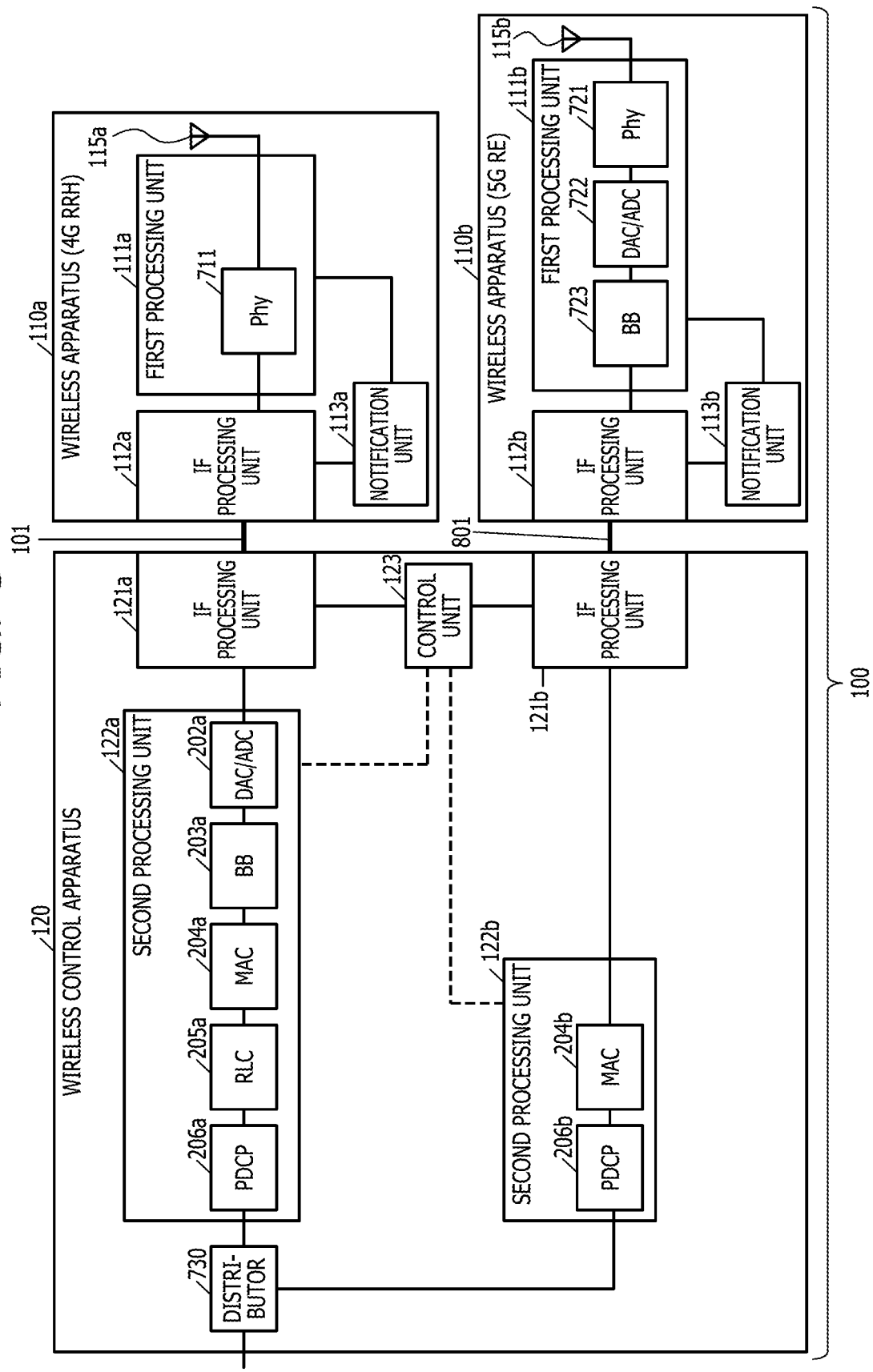
FIG. 8 is a diagram illustrating another example of the configuration in which different wireless apparatuses are existed together in the wireless base station according to the first embodiment.

FIG. 8 is a diagram illustrating another example of the configuration in which different wireless apparatuses are existed together in the wireless base station according to the first embodiment. In FIG. 8, a portion that is the same as the portion that is illustrated in FIG. 7 is given the same numeral reference, and a description thereof is omitted. In an example that is illustrated in FIG. 8, the wireless apparatus 110a and the wireless apparatus 110b are connected in the cascade topology to the wireless control apparatus 120. For example, the wireless apparatus 110b is connected to the wireless control apparatus 120 through the transfer path 801 without the wireless apparatus 110a in between. The configuration information that is transmitted from the notification unit 113b of the wireless apparatus 110b through the IF processing unit 112b is transmitted to the wireless control apparatus 120 through a transfer path 801. A star connection, for example, is a connection topology in which each of the wireless apparatuses 110a and 110b is connected directly to the wireless control apparatus.

In the example that is illustrated in FIG. 8, the wireless control apparatus 120 includes the IF processing units 121a and 121b instead of the IF processing unit 121 that is illustrated in FIG. 7. Each of the IF processing units 121a and 121b has the same configuration as the IF processing unit 121. However, the IF processing unit 121a outputs the configuration information that is transmitted from the wireless apparatus 110a, to the control unit 123. The IF processing unit 121b outputs the configuration information that is transmitted from the wireless apparatus 110b, to the control unit 123.

Based on the configuration information from the wireless apparatus 110a, which is output from the IF processing unit 121a, the control unit 123 sets the second processing unit 122a that performs the communication with the wireless apparatus 110a. Based on the configuration information from the wireless apparatus 110b, which is output from the IF processing unit 121b, the control unit 123 sets the second processing unit 122b that performs the communication with the wireless apparatus 110b.

Subsequently, a portion that differs from that in the example that is illustrated in FIG. 7, of the transfer of the downlink signal that is received by the wireless base station 100 from a higher-layer apparatus and is transmitted to the wireless terminal will be described. The second processing unit 122a performs the second signal processing by the second processing unit 122a on the signal that is output from the distribution unit 730, and outputs the signal on which the second signal processing is performed, to the IF processing unit 121a. The second processing unit 122b performs the second signal processing by the second processing unit 122b on the signal that is output from the distribution unit 730, and outputs the signal on which the second signal processing is performed, to the IF processing unit 121b.

The IF processing unit 121a transmits a signal that is output from the second processing unit 122a, to the wireless apparatus 110a through the transfer path 101. At this time, the IF processing unit 121a transmits the signal from the second processing unit 122a to the wireless apparatus 110a by the transfer path 101 using the transfer method that is specified based on the identification information which is added to the signal from the second processing unit 122a.

The IF processing unit 121b transmits a signal that is output from the second processing unit 122b, to the wireless apparatus 110b through the transfer path 801. At this time, the IF processing unit 121b transmits the signal from the second processing unit 122b to the wireless apparatus 110b by the transfer path 801 using the transfer method that is specified based on the identification information which is added to the signal from the second processing unit 122b.

The IF processing unit 112b of the wireless apparatus 110b receives the signal that is transmitted from the wireless control apparatus 120 by the transfer path 801. At this time, the IF processing unit 112b receives the signal using the transfer method that is specified based on the identification information which is added to the signal that is transmitted from the wireless apparatus 110a by the transfer path 801.

Subsequently, a portion that differs from that in the example that is illustrated in FIG. 7, of the transfer of the uplink signal that is received by the wireless base station 100 from the wireless terminal and is transmitted to a higher-layer apparatus. The IF processing unit 112b of the wireless apparatus 110b transmits the signal that is output from the first processing unit 111b, to the wireless control apparatus 120 by the transfer path 801. At this time, the IF processing unit 112b transmits the signal using the transfer method that is specified with the identification information which is added to the signal that is output from the first processing unit 111b.

The IF processing unit 112a transmits the signal to the wireless control apparatus 120 by the transfer path 101 using the transfer method that is specified based on the identification information which is added to the signal that is output from the first processing unit 111a.

The IF processing unit 121a of the wireless control apparatus 120 transmits the signal using the transfer method that is specified based on the identification information which is added to the signal that is transmitted from the wireless apparatus 110a by the transfer path 101, and outputs the received signal to the second processing unit 122a.

The IF processing unit 121b receives the signal using the transfer method that is specified based on the identification information which is added to the signal that is transmitted from the wireless apparatus 110b by the transfer path 801, and outputs the received signal to the second processing unit 122b. The second processing unit 122b performs the second signal processing by the second processing unit 122b on a signal that is output from the IF processing unit 121b, and outputs the signal on which the second signal processing is performed, to the distribution unit 730.

A configuration is described in which the wireless apparatuses 110a and 110b are connected in a star topology, as the wireless base stations 100, to the wireless control apparatus 120, but a configuration may be applied in which three or more wireless base stations 100 are connected in the star topology to the wireless control apparatus 120. A configuration may be applied in which three or more wireless base stations 100 are connected to the wireless control apparatus 120, in a manner that mixes a connection in the cascade topology and a connection in the star topology. The split point of the base station signal processing to which each of the wireless apparatuses 110 that are connected to the wireless control apparatus 120 corresponds may be changed in various ways without being limited to the example that is illustrated in FIG. 8.

(Mobile Communication Network to which the Wireless Base Station According to the First Embodiment May be Applied)

Figure 9:
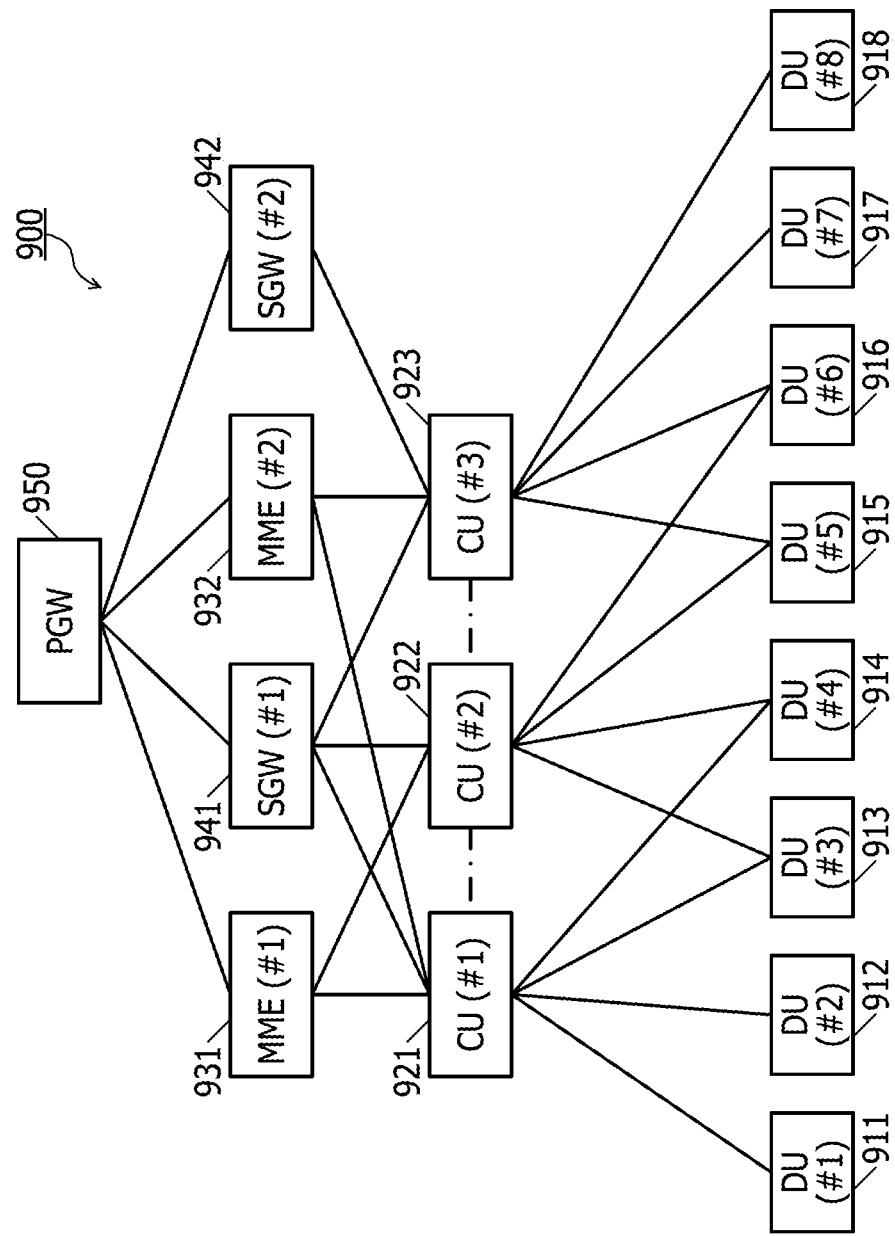
FIG. 9 is a diagram illustrating an example of the wireless base station can be applied in a mobile communication network according to the first embodiment.

FIG. 9 is a diagram illustrating an example of a mobile communication network to which the wireless base station according to the first embodiment may be applied. The wireless base station 100 according to the first embodiment, for example, may be applied to a mobile communication network 900 that is illustrated in FIG. 9.

In an example that is illustrated in FIG. 9, a mobile communication network 900 includes DUs 911 to 918 (#1 to #8), CUs 921 to 923 (#1 to #3), MMEs 931 and 932 (#1 and #2), SGWs 941 and 942 (#1 and #2), and a PGW 950. PGW is short for Packet data network Gateway.

Each of the DUs 911 to 918 is an apparatus that may be the wireless apparatus 110 which performs the first signal processing in the wireless base station 100. Among the DUs 911 to 918, DUs are existed together among which the processing, which is included in the first signal processing that is to be performed, differs. Among the DUs 911 to 918, DUs are existed together among which the split point of the base station signal processing differs.

Each of the CU 921 to 923 is an apparatus that may be the wireless control apparatus 120 that performs the second signal processing in the wireless base station 100. The CUs 921 to 923 are CUs that possibly correspond to multiple split points, respectively, of the base station signal processing. For example, each of the CUs 921 to 923 sets the processing that is included in the second signal processing by each of the CUs 921 to 923 themselves, according to the processing that is included in the first signal processing by the DU that is the wireless base station 100 as well as the DU itself among the DUs 911 to 918.

The CU 921 is connected to the DUs 911 to 914 through an interface between the CU and the DU. The CU 922 is connected to the DUs 913 to 916 through an interface between the CU and the DU. The CU 923 is connected to the DUs 915 to 918 through an interface between the CU and the DU. The interface between the CU and the DU, for example, is a transfer path that corresponds to the above-described transfer paths 101 and 801. As illustrated in FIG. 9, at least one or more of the DUs 911 to 918 are connected to each of the CUs 921 to 923 through the interface between the CU and the DU. Each of the DUs 911 to 918 is connected one or more CUs of the CUs 921 to 923 through the interface between the CU and the DU.

An inter-CU interface connects between the CU 921 and the CU 922. An inter-CU interface connects between the CU 922 and the CU 923. The CU 921 is connected to the MMEs 931 and 932 and the SGW 941. The CU 922 is connected to the MME 931 and the SGW 941. The CU 923 is connected to the MME 932 and the SGWs 941 and 942. As illustrated in FIG. 9, each of the CU 921 to 923 is connected to one or more MMEs of the MMEs 931 and 932 and one or more SGWs of the SGWs 941 and 942.

Each of the MMEs 931 and 932 and the SGWs 941 and 942 is an apparatus that may be a higher-layer apparatus in the wireless base station 100 described above. Each of the MMEs 931 and 932 and the SGWs 941 and 942 is connected to the PGW 950. Between the PGW 950 and each of the CUs 921 to 923, a control plane (C-Plane) signal is transferred through the MMEs 931 and 932, and a user plane (U-Plane) signal is transferred through the SGWs 941 and 942.

One or more DUs of the DUs 911 to 918 are set to be the wireless apparatus 110 and one more CUs of the CUs 921 to 923 are set to be the wireless control apparatus 120, and thus the wireless base station 100 according to the first embodiment may be realized. Multiple combinations of one more DUs of the DUs 911 to 918 and one or more CUs of the CUs 921 to 923 are provided and thus multiple base stations 100 may be realized.

In the example that is illustrated in FIG. 9, a configuration is described in which the DU that is included in the DUs 911 to 918 is connected to the CUs 921 to 923, but a configuration may be applied in which the DU that is included on the DUs 911 to 918 is connected in the cascade topology to the CUs 921 to 923.

As in the example that is illustrated in FIG. 9, multiple DUs may be connected to one CU. Multiple CUs may be connected to one DU. Accordingly, a combination of the CU and the DU may be flexibly changes and thus the wireless base station 100 may be realized. Therefore, for example, a combination with the DU in a DSA, a VC, an AAA, beamforming, a CoMP and the like is flexibly controllable. DSA is short for Distributed Antenna System. VC is short for Virtual Cell. CoMP is short for Coordinated Multiple-Point transmission and reception.

A configuration is described in which the MMEs 931 and 932 are connected to the same PGW 950, but a configuration may be applied in which the MMEs 931 and 932 are connected to different PGWs. A configuration is described in which the SGWs 941 and 942 are connected to the same PGW 950, but a configuration may be applied in which the SGWs 941 and 942 are connected to different PGWs.

(Processing in the Mobile Communication Network According to the First Embodiment)

Figure 10:
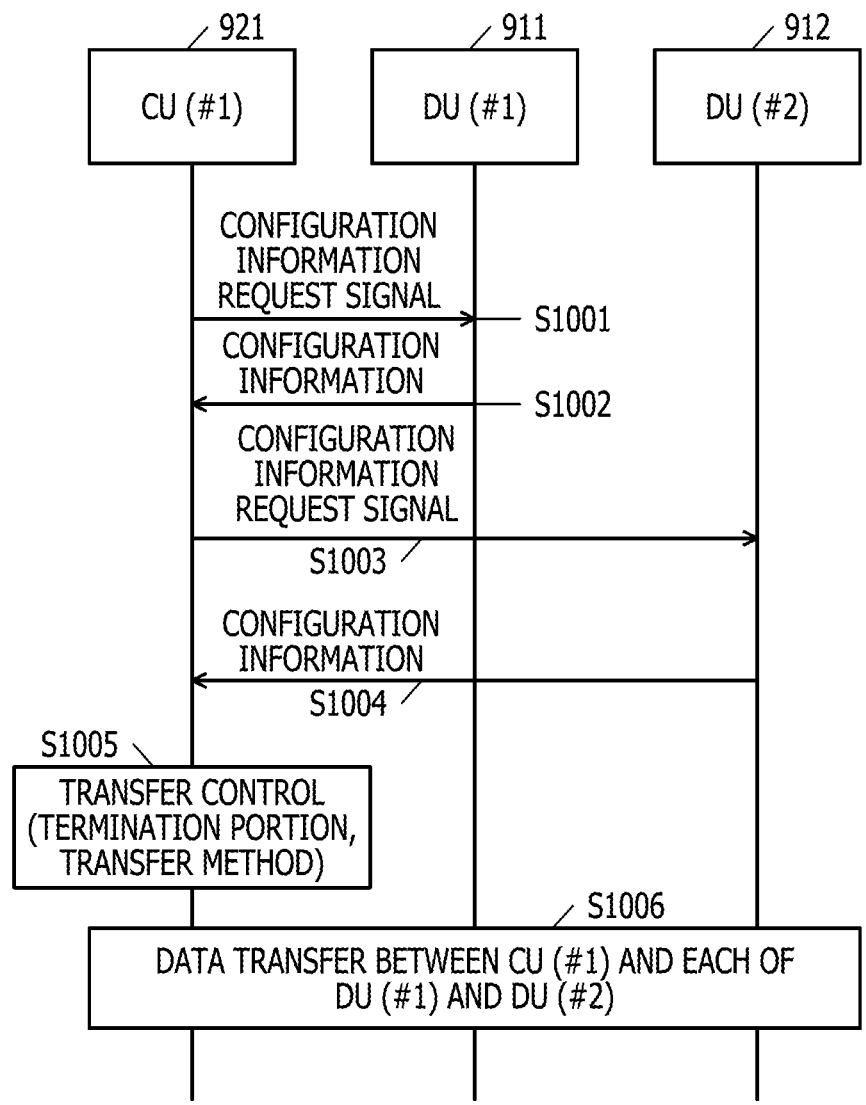
FIG. 10 is a sequence diagram illustrating an example of processing in the mobile communication network according to the first embodiment.

FIG. 10 is a sequence diagram illustrating an example of processing in the mobile communication network according to the first embodiment. FIG. 10, a case where the wireless base station 100 is realized by the CU 921 (#1) and the DUs 911 and 912 (#1 and #2) that are illustrated in FIG. 9 is described with reference with FIG. 10. In this case, for example, the CU 921 and the DUs 911 and 912 may be applied in the wireless control apparatus 120 and the wireless apparatuses 110a and 110b that are illustrated in FIG. 8, respectively.

In a state where the DUs 911 and 912 are connected to the CU 921, for example, each step that is illustrated in FIG. 10 is performed. First, the CU 921 transmits the configuration information request signal that requests the transmission of the configuration information, to the DU 911 (Step S1001). As an example, the control unit 123 of the wireless control apparatus 120 that is illustrated in FIG. 8 may perform the transmission of the configuration information request signal in Step S1001 through the transfer path 101, using the IF processing unit 121a. As an example, the configuration information request signal that is transmitted in Step S1001 is received in the notification unit 113a through the IF processing unit 112a that is illustrated in FIG. 8.

Subsequently, the DU 911 transmits the configuration information relating to the first signal processing by the DU 911 itself to the CU 921 (Step S1002). As an example, the notification unit 113a of the wireless apparatus 110a that is illustrated in FIG. 8 may perform the transmission of the configuration information in Step S1002 through the transfer path 101, using the IF processing unit 112a. As an example, the configuration information that is transmitted in Step S1002 is received in the control unit 123 through the IF processing unit 121a that is illustrated in FIG. 8.

Subsequently, the CU 921 transmits the configuration information request signal that requests the transmission of the configuration information, to the DU 912 (Step S1003). As an example, the control unit 123 of the wireless control apparatus 120 that is illustrated in FIG. 8 may perform the transmission of the configuration information request signal in Step S1003 through the transfer path 801, using the IF processing unit 121b. As an example, the configuration information request signal that is transmitted in Step S1003 is received in the notification unit 113b through the IF processing unit 112b that is illustrated in FIG. 8.

Subsequently, the DU 912 transmits the configuration information relating to the first signal processing by the DU 912 itself to the CU 921 (Step S1004). As an example, the notification unit 113b of the wireless apparatus 110b that is illustrated in FIG. 8 may perform the transmission of the configuration information in Step S1004 through the transfer path 801, using the IF processing unit 112b. As an example, the configuration information that is transmitted in Step S1004 is received in the control unit 123 through the IF processing unit 121b that is illustrated in FIG. 8.

Subsequently, based on each of the pieces of configuration information that are received in Steps S1002 and S1004, the CPU 921 performs control (setting) of transfer between the DUs 911 and 912 (Step S1005). Transfer control in Step S1005 will be described below. Subsequently, data transfer is performed between the CU 921 and each of the DUs 911 and 912 (Step S1006). Accordingly, it is possible that the CU 921 performs data transfer to and from the wireless terminal through the DUs 911 and 912.

The transfer control in Step S1005, for example, includes setting of the processing (a termination portion of the second signal processing) that is included in the second signal processing which is performed by the CU 921 on the signal that is to be transferred by the DU 911, of the signals that are to be transferred by the wireless base station 100 to and from the wireless terminal. The transfer control in Step S1005 may include control of the transfer method for transferring by the transfer path 101 the signal that is to be transferred by the DU 911, of the signals that are to be transferred by the wireless base station 100 to and from the wireless terminal.

The transfer control in Step S1005, for example, includes setting of the processing (a termination portion of the second signal processing) that is included in the second signal processing which is performed by the CU 921 on the signal that is to be transferred by the DU 912, of the signals that are to be transferred by the wireless base station 100 to and from the wireless terminal. The transfer control in Step S1005 may include control of the transfer method for transferring by the transfer path 101 the signal that is to be transferred by the DU 912, of the signals that are to be transferred by the wireless base station 100 to and from the wireless terminal.

In an example that is illustrated in FIG. 10, the processing in a case where the DUs 911 and 912 are connected in the star topology to the CU 921 as illustrated in FIG. 9 is described with reference to an example that is illustrated in FIG. 10, the same is also true for the processing in a case where the DUs 911 and 912 are connected in the cascade topology to the CU 921. For example, the DU 911 is connected to the CU 921 through the transfer path 101, and the DU 912 is connected to the DU 911 through the transfer path 701.

In this case, for example, the CU 921 and the DUs 922 and 911 may be applied to the wireless control apparatus 120 and the wireless apparatuses 110a and 110b that are illustrated in FIG. 7, respectively. In this case, transfer of the configuration information request signal and the configuration information in Steps S1003 and S1004 is performed through the DU 911. Data transfer between the CU 921 and the DU 912 in Step S1006 is performed through the DU 911.

Figure 11:
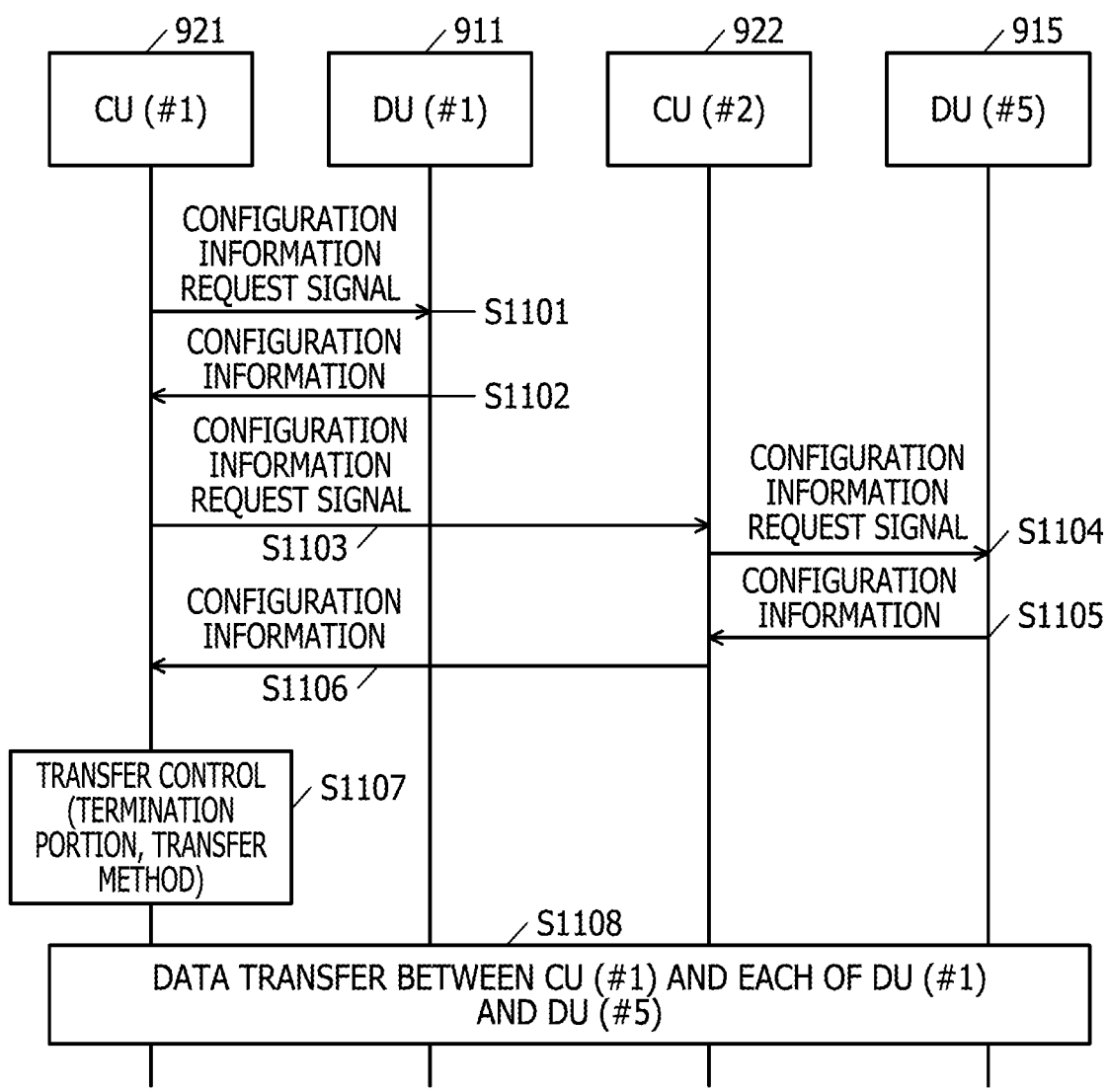
FIG. 11 is a sequence diagram illustrating another example of the processing in the mobile communication network according to the first embodiment.

FIG. 11 is a sequence diagram illustrating another example of the processing in the mobile communication network according to the first embodiment. A case where the wireless base station 100 is realized by the CU 921 (#1) and the DUs 911 and 915 (#1 and #5) that are illustrated in FIG. 9 is described with reference to FIG. 11. In this case, for example, the CU 921 and the DUs 911 and 925 may be applied to the wireless control apparatus 120 and the wireless apparatuses 110a and 110b that are illustrated in FIG. 8, respectively.

However, as illustrated in FIG. 9, the interface between the CU and the DU connects between the CU 921 and the DU 911, but the interface between the CU and the DU does not connect between the CU 921 and the DU 915. The DU 915 is connected to the CU 922 (#2) using the interface between the CU and the DU. In this case, the CU 921 performs communication with the DU 915 through the CU 922. The DU 915 and the CU 921 are not connected directly in terms of physical connection, but are connected directly in terms of logical connection. Thus, although the presence of the CU 922 in communication between the CU 921 and the DU 915 is not recognized, this does not pose any problem. In a case where a connection is made physically, this is referred to as a physical connection. In a case where a connection is made logically, this is referred to as a logical connection.

Steps S1101 and S1102 that are illustrated in FIG. 11 are the same as Steps S1001 and S1102 that are illustrated in FIG. 10. Subsequent to Step S1102, the CU 921 transmits the configuration information request signal of which a destination is the DU 915, which is the configuration information request signal that requests the transmission of the configuration information, to the CU 922 (Step S1103). The transmission of the configuration information request signal in Step S1103, for example, is performed through the inter-CU interface between the CUs 921 and 922.

Subsequently, the CU 922 transmits the configuration information request signal that is received in Step S1103, to the DU 915 (Step S1104). The transmission of the configuration information request signal in Step S1104, for example, is performed through the interface between the CU and the DU between the CU 922 and the DU 915. As an example, the configuration information request signal that is transmitted in Step S1104 is received in the notification unit 113b through the IF processing unit 112b that is illustrated in FIG. 8.

Subsequently, the DU 915 transmits the configuration information relating to the first signal processing by the DU 915 itself to the CU 922 (Step S1105). As an example, the notification unit 113b of the wireless apparatus 110b that is illustrated in FIG. 8 may perform the transmission of the configuration information in Step S1105 using the IF processing unit 112b. Subsequently, the CU 922 transmits the configuration information that is received in Step S1105, to the CU 921 (Step S1106). The transmission of the configuration information in Step S1106, for example, is performed through the inter-CU interface between the CUs 921 and 922.

Subsequently, based on each of the pieces of configuration information that are received in Step S1102 and S1106, the CU 921 performs control of transfer between the DUs 911 and 915 (Step S1107). The transfer control in Step s1105 is the same as the transfer control in Step S1005 that is illustrated in FIG. 10. Subsequently, the data transfer is performed between the CU 921 and each of the DUs 911 and 915 (Step S1108). Accordingly, it is possible that the CU 921 performs the data transfer to and from the wireless terminal through the DUs 911 and 915. Data transfer between the CU 921 and the DU 915 in Step S1108 is performed through the CU 922.

As illustrated in FIG. 11, the CU 921 performs communication with the DU 915 through the CU 922 using the inter-CU interface, and thus may perform the data transfer to and from the wireless terminal through the DU 915 that is not connected directly with the CU 921 itself.

Figure 12:
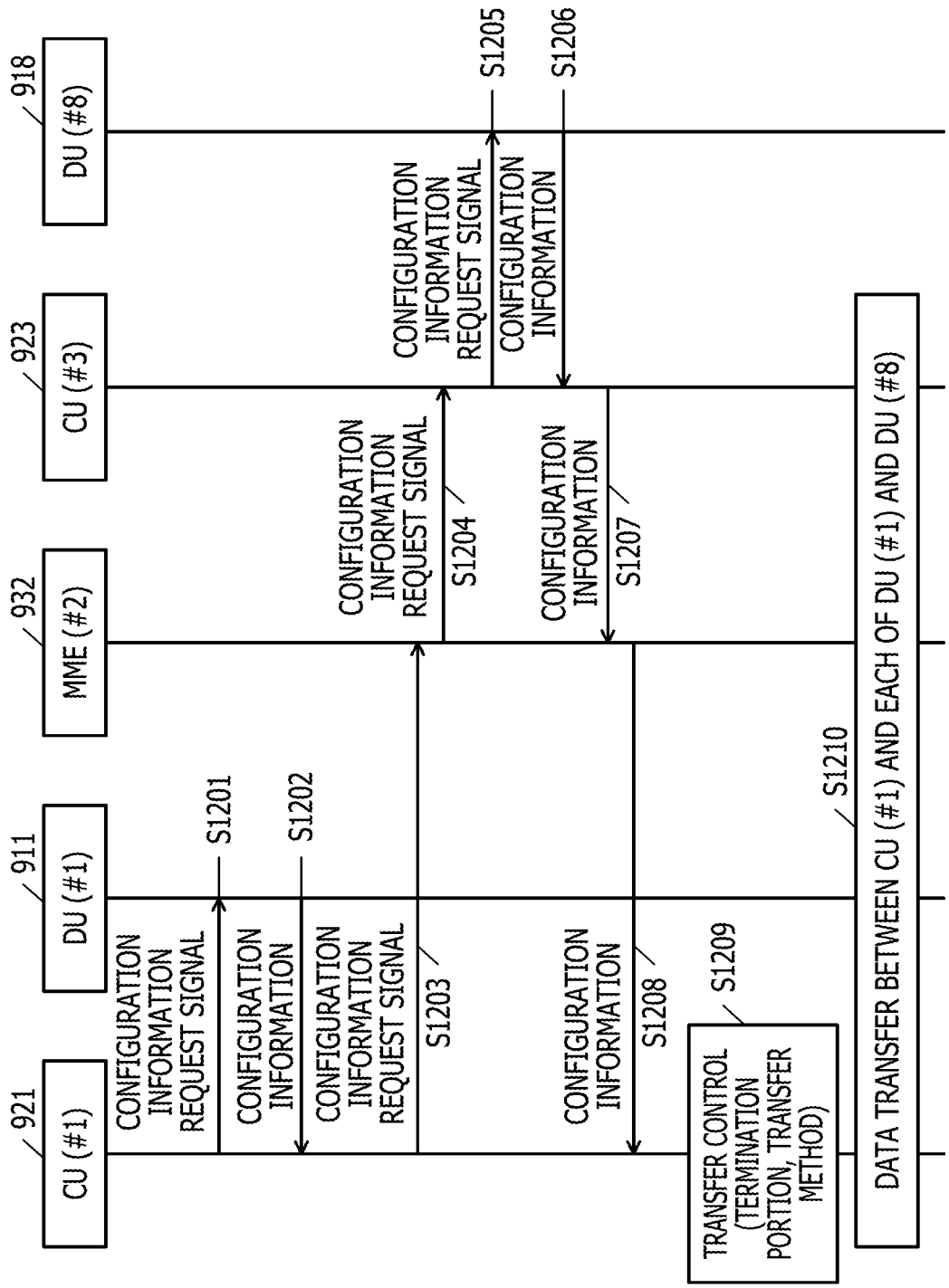
FIG. 12 is a sequence diagram illustrating still another example of the processing in the mobile communication network according to the first embodiment.

FIG. 12 is a sequence diagram illustrating still another example of the processing in the mobile communication network according to the first embodiment. A case where the wireless base station 100 is realized by the CU 921 (#1) and the DUs 911 and 918 (#1 and #8) that are illustrated in FIG. 9 is described with reference with FIG. 12. In this case, for example, the CU 921 and the DUs 911 and 918 may be applied to the wireless control apparatus 120 and the wireless apparatuses 110a and 110b that are illustrated in FIG. 8, respectively.

However, as illustrated in FIG. 9, the interface between the CU and the DU connects between the CU 921 and the DU 911, but the interface between the CU and the DU does not connect between the CU 921 and the DU 918. The DU 918 is connected to the CU 923 (#3) that is connected to the MME 932, using the interface between the CU-DU. In this case, for example, the CU 921 performs communication with the DU 918 through the MME 932 and the CU 923.

Steps S1201 and S1202 that are illustrated in FIG. 12 are the same as Steps S1001 and S1002 that are illustrated in FIG. 10. Subsequent to Step S1202, the CU 921 transmits the configuration information request signal of which a destination is the DU 918, which is the configuration information request signal that requests the transmission of the configuration information, to the MME 932 (Step S1203). The transmission of the configuration information request signal in Step S1203, for example, is performed through the interface between an S1 interface between the CU 921 and the MME 932. Subsequently, the MME 932 transmits the configuration information request signal that is received in Step S1203, to the CU 923 (Step S1204). The transmission of the configuration information request signal in Step S1204, for example, is performed through the S1 interface between the MME 932 and the CU 923.

Subsequently, the CU 923 transmits the configuration information request signal that is received in Step S1204, to the DU 918 (Step S1205). The transmission of the configuration information request signal in Step S1205, for example, is performed through the interface between the CU and the DU between the CU 923 and the DU 918. As an example, the configuration information request signal that is transmitted in Step S1205 is received in the notification unit 113b through the IF processing unit 112b that is illustrated in FIG. 8.

Subsequently, the DU 918 transmits the configuration information of which a destination is the CU 921, which is the configuration information relating to the first signal processing by the DU 918 itself, to the CU 923 (Step S1206). As an example, the notification unit 113b of the wireless apparatus 110b that is illustrated in FIG. 8 may perform the transmission of the configuration information in Step S1206 using the IF processing unit 112b.

Subsequently, the CU 923 transmits the configuration information that is received in Step S1206, to the MME 932

(Step S1207). The transmission of the configuration information in Step S1207, for example, is performed through the S1 interface between the MME 932 and the CU 923. Subsequently, the MME 932 transmits the configuration information that is received in Step S1207, to the CU 921 (Step S1208). The transmission of the configuration information in Step S1208, for example, is performed through the S1 interface between the MME 932 and the CU 921.

Subsequently, based on each of the pieces of configuration information that are received in Step S1202 and S1208, the CU 921 performs control of transfer between the DUs 911 and 918 (Step S1209). The transfer control in Step S1209 is the same as the transfer control in Step S1005 that is illustrated in FIG. 10. Subsequently, the data transfer is performed between the CU 921 and each of the DUs 911 and 918 (Step S1210). Accordingly, it is possible that the CU 921 performs the data transfer to and from the wireless terminal through the DUs 911 and 918. Data transfer between the CU 921 and the DU 918 in Step S1208 is performed through the MME 932 and the CU 923.

As illustrated in FIG. 12, the CU 921 performs communication with the DU 918 through the MME 932 and the CU 923, and thus may perform the data transfer to and from the wireless terminal through the DU 918 that is not connected directly with the CU 921 itself. In a case where the CU 921 is not connected directly to the MME 932 in the example that is illustrated in FIG. 9, the CU 921 may perform communication with the MME 932 through the MME 931 and the PGW 950.

Processing in which the CU 921 transmits the configuration information request signal to each DU is described with reference to FIG. 10, but no limitation to this processing is imposed. For example, processing in which the CU 921 does not transmit the configuration information request signal to each DU and in which each DU transmits the configuration information to the CU 921 at a given timing may be applied.

(Format of a Signal to which the Identification Information According to the First Embodiment is Added)

Figure 13:
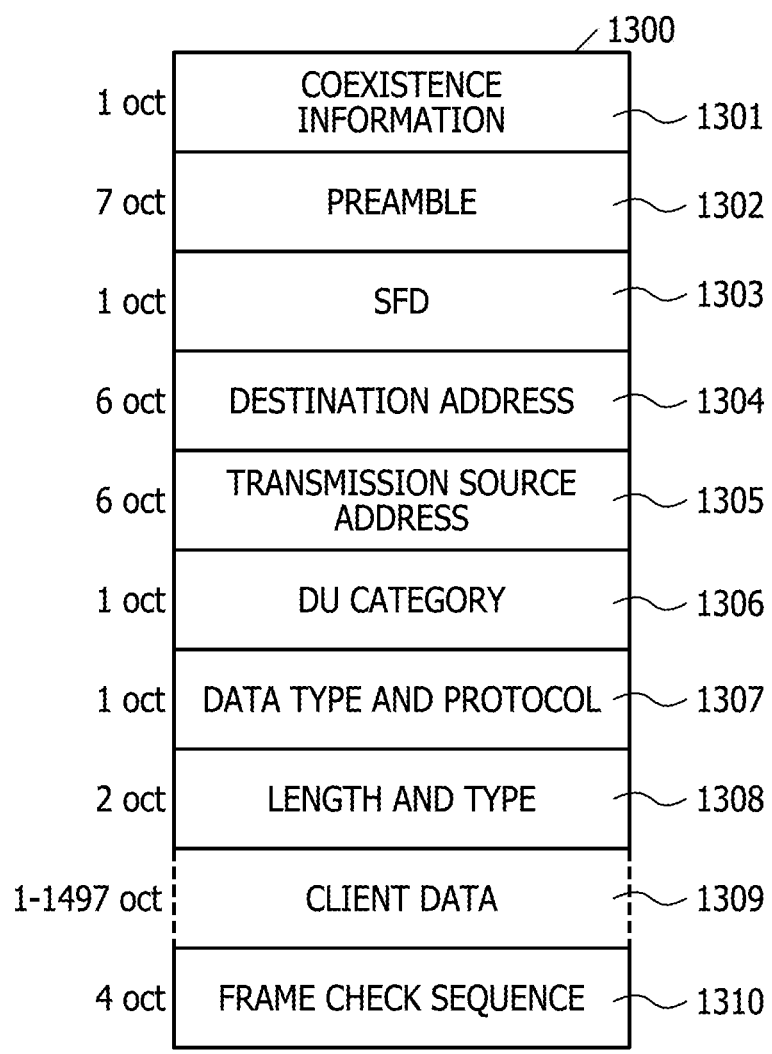
FIG. 13 is a diagram illustrating an example of a format of a signal to which identification information according to the first embodiment is added.

FIG. 13 is a diagram illustrating an example of a format of a signal to which the identification information according to the first embodiment is added. For example, in the wireless base station 100 that is illustrated in FIG. 7, for example, a signal 1300 that is illustrated in FIG. 13 is transferred through the transfer path 101 between the IF processing unit 121 and the IF processing unit 112a.

The signal 1300 includes coexistence information 1301, a preamble 1302, an SFD 1303, a destination address 1304, a transmission source address 1305, a DU category 1306, and a data type and protocol information 1307. Furthermore, the signal 1300 includes a length and type information 1308, a client data 1309, and a frame check sequence 1310. SFD is short for Start Frame Delimitor.

The coexistence information 1301 is one-octet (oct) information indicating whether or not DUs, among which the split point of the base station signal processing differs in the wireless base station 100, are existed together. For example, in the example that is illustrated in FIG. 7, the DUs (the wireless apparatuses 110a and 110b) are existed together among which the split point of the base station signal processing differs in the wireless base station 100. Because of this, the coexistence information 1301 is a value indicating whether or not the coexistence is provided. However, for example, in a case where the mobile communication network is provided on the assumption that the split points of the base station signal processing are existed together, the coexistence information 1301 may be omitted from the signal 1300. The information is described above as being one-octet long, but the information may be multiple octets long and be less than one octet long (that is, less than eight bits) without being limited in an amount of information. In the following, in the same manner, descriptions are provided below on the assumption that no limitation is imposed in the amount of information.

The preamble 1302 is in a given seven-octet pattern. The SFD 1303 is one-octet information indicating a starting point of a frame. The destination address 1304 is six-octet information indicating an identifier of a destination of the signal 1300. The transmission source address 1305 is six-octet information indicating an identifier of a transmission source of the signal 1300. The destination address 1304 and the transmission source address 1305, for example, are not specified for the use of the CPRI, but the destination address 1304 and the transmission source address 1305, as illustrated in FIG. 13, may be used for the signal 1300.

The DU category 1306 is one-octet information indicating a category in accordance with the split point of the base station signal processing, which corresponds to the signal 1300. The split point of the base station signal processing that corresponds to the signal 1300, for example, is a split point of the base station signal processing to which the DU that transmits or receives the signal 1300 corresponds.

The data type and protocol information 1307 is one-octet information indicating a type of data of the signal 1300 at the time of the transfer by an interface between the CU and the DU, or a protocol for transferring the signal 1300 by the interface between the CU and the DU, or any combination thereof. Each of the type of data and the protocol differs with the split point of the base station signal processing, which is indicated by the DU category 1306.

The length and type information 1308 is two-octet information indicating by which one of a single hop and a multi-hop the signal 1300 is transferred. The client data 1309 is data that is transferred by the interface between the CU and the DU. The type of data of the client data 1309 differs with the split point of the base station signal processing, which is indicated by the DU category 1306. The frame check sequence 1310 is redundant information for detecting an error in the signal 1300. As is the case with the above-described cascade connection in the cascade topology, the multi-hop is a format for performing the data transfer between a transmission source and a transmission destination through multiple apparatuses and the single hop is a format for performing the data transfer directly between the transmission source and the transmission destination without any other apparatus in between.

The identification information described above, for example, may be realized by the DU category 1306 or the data type and protocol information 1307 or any combination there. For example, in a case where the identification information is realized by the DU category 1306, the data type and protocol information 1307 may be omitted from the signal 1300. In a case where the identification information is realized by the data type and protocol information 1307, the DU category 1306 may be omitted from the signal 1300.

For example, it is possible that the IF processing unit 121 of the wireless control apparatus 120 receives at least the DU category 1306 or the data type and protocol information 1307 in the signal 1300 that is input, without depending on the split point of the base station signal processing that corresponds to the signal 1300 that is input. Based on the DU category 1306 or the data type and protocol information 1307 or any combination thereof, the IF processing unit 121 determines the split point of the base station signal processing that corresponds to the signal 1300. Then, based on a result of the determination, the IF processing unit 121 switches a method of transferring the client data 1309. The processing in which the IF processing unit 121 switches the transfer method based on the identification information is described, but the same is also true for processing in which the second processing units 122, 122*a*, and 122*b* switch the transfer method based on the identification information.

The configuration information described above, for example, may be realized by the signal 1300 that is illustrated in FIG. 13. For example, the configuration information may be set to be the DU category 1306 or the data type and protocol information 1307, which is included in the signal 1300, or any combination thereof. For example, the notification unit 113 of the wireless apparatus 110 transmits the signal 1300, which is illustrated in FIG. 13, as the configuration information, to the wireless control apparatus 120. In this case, for example, the length and type information 1308 or the client data 1309 may be omitted from the signal 1300.

Figure 14:
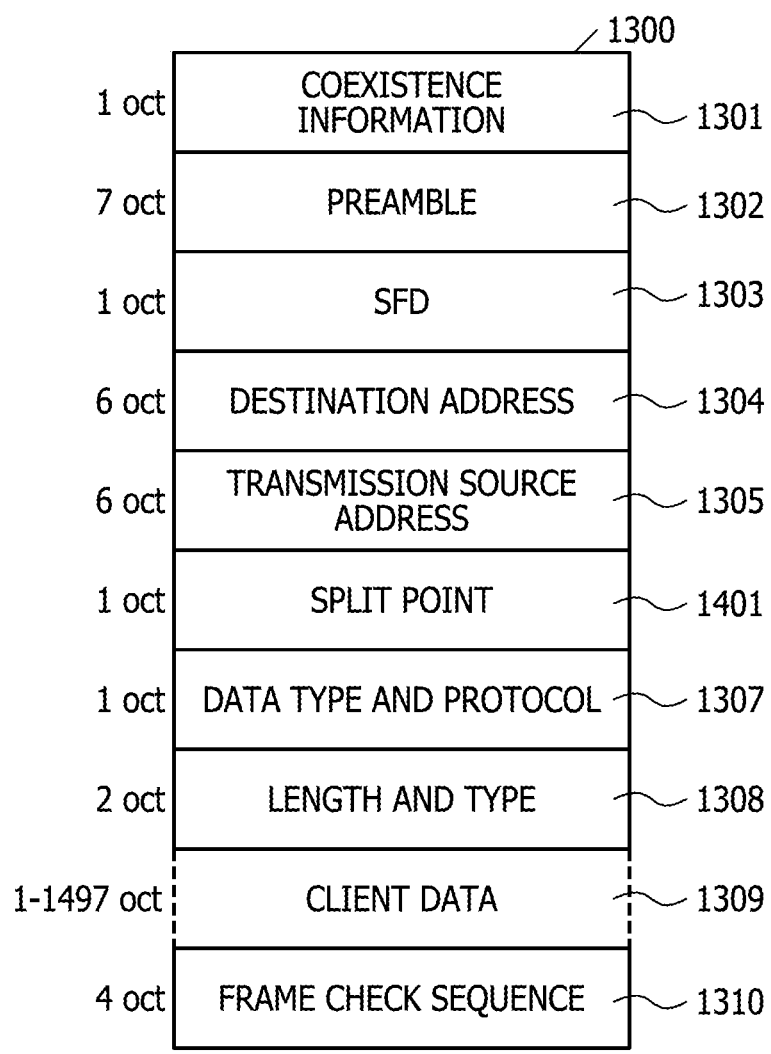
FIG. 14 is a diagram illustrating another example of the format of the signal to which the identification information according to the first embodiment is added.

FIG. 14 is a diagram illustrating another example of the format of the signal to which the identification information according to the first embodiment is added. In FIG. 14, a portion that is the same as the portion that is illustrated in FIG. 13 is given the same reference numeral and a description thereof is omitted. For example, in the wireless base station 100 that is illustrated in FIG. 7, for example, the signal 1300 that is illustrated in FIG. 14 may be transferred through the transfer path 101 between the IF processing unit 121 and the IF processing unit 112*a*.

The signal 1300 that is illustrated in FIG. 14 includes a split point 1401 instead of the DU category 1306 in the signal 1300 that is illustrated in FIG. 13. The split point 1401 is one-octet information indicating the split point of the base station signal processing that corresponds to the signal 1300.

The identification information described above, for example, may be realized by the split point 1401 or the data type and protocol information 1307 or any combination thereof. For example, in a case where the identification information is realized by the split point 1401, the data type and protocol information 1307 may be omitted from the signal 1300. In the case where the identification information is realized by the data type and protocol information 1307, the split point 1401 may be omitted from the signal 1300.

For example, it is possible that the IF processing unit 121 receives at least the split point 1401 or the data type and protocol information 1307 in the signal 1300 that is input, without depending on the split point that corresponds to the signal 1300 that is input. The IF processing unit 121 determines the split point that corresponds to the signal 1300, based on the split point 1401 or the data type and protocol information 1307 or any combination thereof, and, based on a result of the determination, switches the method of transferring the client data 1309. The processing in which the IF processing unit 121 switches the transfer method based on the identification information is described, but the same is also true for the processing in which the second processing units 122, 122*a*, and 122*b* switch the transfer method based on the identification information.

The configuration information described above, for example, may be realized by the signal 1300 that is illustrated in FIG. 14. For example, the configuration information may be set to be the split point 1401 or the data type and protocol information 1307, which is included in the signal 1300, or any combination thereof. For example, the notification unit 113 of the wireless apparatus 110 transmits the signal 1300, which is illustrated in FIG. 14, as the configuration information, to the wireless control apparatus 120. In this case, for example, the length and type information 1308 or the client data 1309 may be omitted from the signal 1300.

(DU Category in Accordance with Every Split Point of the Base Station Processing According to the First Embodiment)

FIG. 15 is a diagram illustrating an example of the DU category in accordance with every split point of the base station signal processing according to the first embodiment. A table 1500 that is illustrated in FIG. 15 provides the DU category in accordance with the split point of the base station signal processing, which is defined in the mobile communication network to which the wireless base station 100 may be applied. DU categories 1 to 8 correspond to split points 8 to 1, respectively.

A type of transfer data in the table 1500 is a type of data in accordance with the split point of the base station signal processing, and is a type of data of a signal that is to be transferred through the interface between the CU and the DU. In an example that is illustrated in FIG. 15, types of transfer data include analog IQ data, digital IQ data, MAC PDU, MAC SDU, RLC PDU, RLC SDU, PDCP PDU, and PDCP SDU.

A protocol in the table 1500 is a protocol in accordance with the split point of the base station signal processing, and is a protocol for transfer of a signal, which is performed through the interface between the CU and the DU. In the example that is illustrated in FIG. 15, protocols are assumed to include CPRI and P1 to P7. Each of P1 to P7, for example, is a protocol that is newly defined according to the split point of the base station signal processing.

A function in the table 1500 is a function (processing) that is included in the first signal processing by the DU, which is in accordance with the split point. In the example that is illustrated in FIG. 15, processing by each of the RF, the Phy, the BB, the MAC, the RLC, and the PDCP is assumed to be included in the base station signal processing in the wireless base station 100.

The split point 8 that corresponds to the DU category 1 is a split point at which that the split of the base station signal processing takes place between the RF and the Phy. At the split point 8, the processing by the RF is included in the first signal processing by the DU. Therefore, at the split point 8, the processing by each of the Phy, the BB, the MAC, the RLC, and the PDCP is included in the second signal processing by the CU. At the split point 8, the analog IQ data is transferred using the CPRI through the interface between the CU and the DU.

The split point 7 that corresponds to the DU category 2 is a split point at which the split of the base station signal processing takes place between the Phy and the BB. At the split point 7, the processing by each of the RF and the Phy is included in the first signal processing by the DU. Therefore, at the split point 7, the processing by each of the BB, the MAC, the RLC, and the PDCP is included in the second signal processing by the CU. At the split point 7, the digital IQ data is transferred using P1 through the interface between the CU and the DU.

The split point 6 that corresponds to the DU category 3 is a split point at which the split of the base station signal processing takes place between the BB and the MAC, and for example, is a split point that is illustrated in FIG. 4. At the split point 6, the processing by each of the RF, the Phy, and the BB is included in the first signal processing by the DU. Therefore, at the split point 6, the processing by each of the MAC, the RLC, and the PDCP is included in the second signal processing by the CU. At the split point 6, the MAC PDU is transferred using P2 through the interface between the CU and the DU.

The split point 5 that corresponds to the DU category 4 is a split point at which the split of the base station signal processing takes place in the middle of the MAC (for example, the conversion units of the PDU and the SDU). At the split point 5, the processing by each of the RF, the Phy, and the BB, and the processing by one portion (for example, Low-MAC) of the MAC are included in the first signal processing by the DU. Therefore, at the split point 5, the processing by one portion (for example, High-MAC) of the MAC and the processing by each of the RLC and PDCP are included in the second signal processing by the CU. At the split point 5, the MAC SDU is transferred using P3 through the interface between the CU and the DU.

The split point 4 that corresponds to the DU category 5 is a split point at which the split of the base station signal processing takes place between the MAC and the RLC, and for example, is a split point that is illustrated in FIG. 5. At the split point 4, the processing by each of the RF, the Phy, the BB, and MAC is included in the first signal processing by the DU. Therefore, at the split point 4, the processing by each of the RLC and the PDCP is included in the second signal processing by the CU. At the split point 4, the RLC PDU is transferred using P4 through the interface between the CU and the DU.

The split point 3 that corresponds to the DU category 6 is a split point at which the split of the base station signal processing takes place in the middle of the RLC (for example, the conversion units of the PDU and the SDU). At the split point 4, the processing operations by one (for example, the RLC) or several of the RF, the Phy, the BB, the MAC and the RLC are included in the first signal processing by the DU. Therefore, at the split point 4, the processing by one portion (for example, High-RLC) of the RLC and the processing by the PDCP are included in the second signal processing by the CU. At the split point 4, the RLC SDU is transferred using P5 through the interface between the CU and the DU.

The split point 2 that corresponds to the DU category 7 is a split point at which the split of the base station signal processing takes place between the RLC and the PDCP, and for example, is a split point that is illustrated in FIG. 6. At the split point 2, the processing by each of the RF, the Phy, the BB, the MAC, the RLC is included in the first signal processing by the DU. Therefore, at the split point 2, the processing by the PDCP is included in the second signal processing by the CU. At the split point 2, the PDCP PDU is transferred using P6 through the interface between the CU and the DU.

The split point 1 that corresponds to the DU category 8 is a split point at which the split of the base station signal processing takes place in the middle of the PDCP (for example, the conversion units of the PDU and the SDU). At the split point 1, the processing by each of the RF, the Phy, the BB, the MAC, and the RLC, and the processing by one portion (for example, Low-PDCP) of the PDCP are included in the first signal processing by the DU. Therefore, at the split point 1, processing by one portion (for example, High-PDCP) of the PDCP is included in the second signal processing by the CU. At the split point 1, the PDCP SDU is transferred using P7 through the interface between the CU and the DU.

For example, in a state of being connected to the wireless control apparatus 120, the wireless apparatus 110 that is illustrated in FIG. 4 transmits DU category=3, split point=6, type of transfer data=MAC PDU, or protocol=P2, or any combination thereof, as the configuration information, to the wireless control apparatus 120. Accordingly, the wireless control apparatus 120 determines that the wireless apparatus 110 applies a configuration that corresponds to the split point 6, and performs a setting for performing processing for each of the MAC, the RLC, and the PDCP in the second processing unit 122 of the wireless control apparatus 120 itself. The wireless control apparatus 120 performs a setting for transferring the MAC PDU using a protocol that is P2, through the transfer path 101 between the wireless control apparatus 120 and the wireless apparatus 110.

In the state of being connected to the wireless control apparatus 120, the wireless apparatus 110 that is illustrated in FIG. 5 transmits DU category=5, split point=4, type of transfer data=RLC PDU, or protocol=P4, or any combination thereof, as the configuration information, to the wireless control apparatus 120. Accordingly, the wireless control apparatus 120 determines that the wireless apparatus 110 applies a configuration that corresponds to the split point 4, and performs a setting for performing the processing for each of the RLC and the PDCP in the second processing unit 122 of the wireless control apparatus 120 itself. The wireless control apparatus 120 performs a setting for transferring the RLC PDU using a protocol that is P4, through the transfer path 101 between the wireless control apparatus 120 and the wireless apparatus 110.

In the state of being connected to the wireless control apparatus 120, the wireless apparatus 110 that is illustrated in FIG. 6 transmits DU category=7, split point=2, type of transfer data=PDCP PDU, or protocol=P6, or any combination thereof, as the configuration information, to the wireless control apparatus 120. Accordingly, the wireless control apparatus 120 determines that the wireless apparatus 110 applies a configuration that corresponds to the split point 2, and performs a setting for performing the processing for the PDCP in the second processing unit 122 of the wireless control apparatus 120 itself. The wireless control apparatus 120 performs a setting for transferring the PDCP PDU using a protocol that is P6, through the transfer path 101 between the wireless control apparatus 120 and the wireless apparatus 110.

However, the DU category in accordance with every split point of the base station signal processing is not limited to an example that is provided in the table 1500. For example, the table 1500 is an example that is based on a candidate for the split point of the base station signal processing, which is specified in 3GPP TR38.801 V0.2.0 6.1.2.1. 3GPP is short for 3rd Generation Partnership Project. For example, it is possible that the split point itself, the DU category, the type of transfer data, the protocol, and the definition of functions are variously changed according to a mobile communication system that is actually in operation.

(Hardware Configuration of the Wireless Apparatus According to the First Embodiment)

Figure 16:
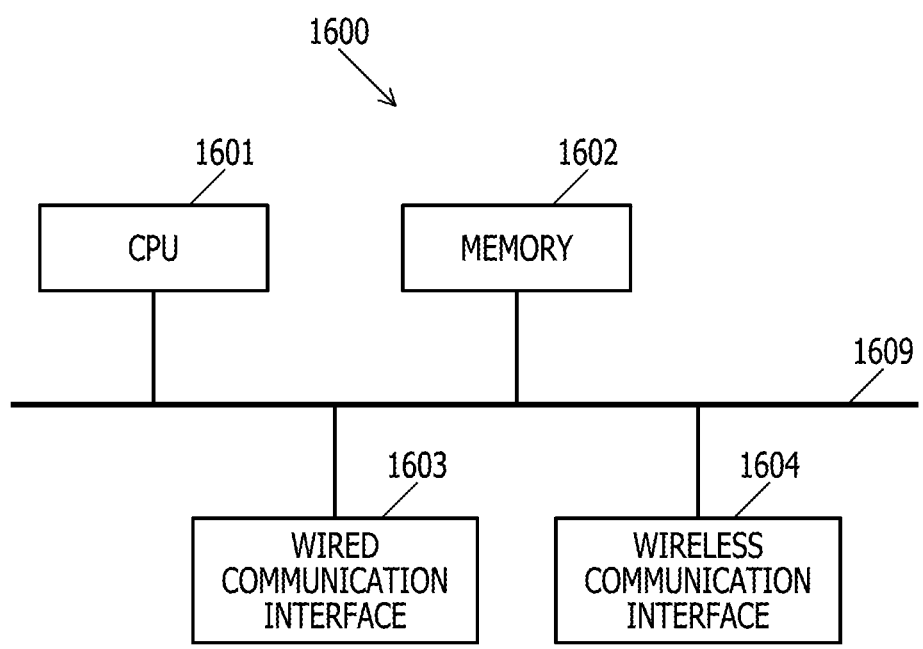
FIG. 16 is a diagram illustrating an example of a hardware configuration of a wireless apparatus to the first embodiment.

FIG. 16 is a diagram illustrating an example of a hardware configuration of the wireless apparatus to the first embodiment. The wireless apparatus 110 described above, for example, may be realized by a communication apparatus 1600 that is illustrated in FIG. 16. The communication apparatus 1600 includes a CPU 1601, a memory 1602, a wired communication interface 1603, and a wireless communication interface 1604. The CPU 1601, the memory 1602, the wired communication interface 1603, and the wireless communication interface 1604 are connected to each other with a bus 1609. CPU is short for Central Processing Unit.

The CPU 1601 manages control of the entire communication apparatus 1600. The memories 1602, for example, include a main memory and an auxiliary memory. The memory, for example, is a random access memory (RAM). The main memory is used as a work area for the CPU 1601. The auxiliary memory is, for example, a nonvolatile memory, such as a magnetic disk, an optical disk, or a flash memory. Various programs that cause the communication apparatus 1600 to operate are stored in the auxiliary memory. The program that is stored in the auxiliary memory is loaded onto the main memory and is executed by the CPU 1601.

The wireless communication interface 1604 is a communication interface that performs communication with the outside (for example, the wireless terminal) of the communication apparatus 1600 in a wireless manner. The wireless communication interface 1604 is controlled by the CPU 1601.

The wired communication interface 1603 is a communication interface that performs communication with any other apparatus (for example, the wireless control apparatus 120) in the wireless base station 100 in a wired manner. The wired communication interface 1603 is controlled by the CPU 1601.

The antenna 115 that is illustrated in FIG. 1, for example, is included in the wireless communication interface 1604. The first processing unit 111 that is illustrated in FIG. 1, for example, may be realized by the CPU 1601 or the wireless communication interface 1604 or any combination thereof. The IF processing units 112 that is illustrated in FIG. 1, for example, may be realized by the wired communication interface 1603. The notification unit 113 that is illustrated in FIG. 1, for example, may be realized by the CPU 1601 or the wired communication interface 1603 or any combination thereof.

Furthermore, a hardware configuration of the wireless apparatus 110 is not limited to a hardware configuration that is illustrated in FIG. 16. For example, a configuration that corresponds to the CPU 1601 or the memory 1602 may be realized using a Field Programmable Gate Array (FPGA), a Digital Signal Processor (DSP), or the like. As for the hardware configuration of radio unit 110*a* and 110*b*, it is similar though it explained the hardware configuration of radio unit 110.

(Hardware Configuration of the Wireless Control Apparatus according to the First Embodiment).

Figure 17:
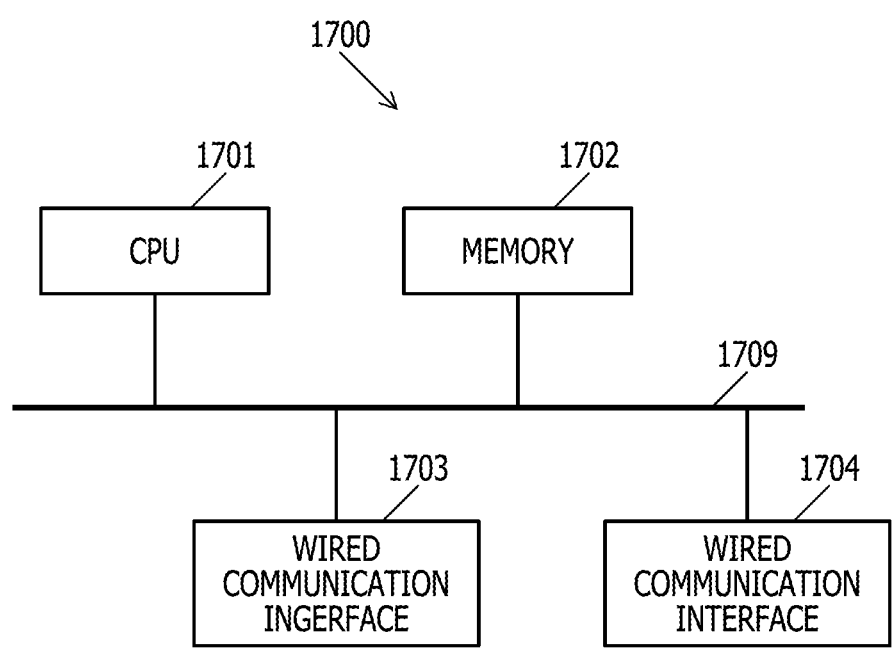
FIG. 17 is a diagram illustrating an example of a hardware configuration of a wireless control apparatus according to the first embodiment.

FIG. 17 is a diagram illustrating an example of a hardware configuration of the wireless control apparatus to the first embodiment. The wireless control apparatus 120 described above, for example, may be realized by an information processing apparatus 1700 that is illustrated in FIG. 17. The information processing apparatus 1700 includes a CPU 1701, a memory 1702, and wired communication interfaces 1703 and 1704. The CPU 1701, the memory 1702, and the wired communication interfaces 1703 and 1704 are connected to each other with a bus 1709.

The CPU 1701 controls the entire information processing apparatus 1700. The memories 1702, for example, include a main memory and an auxiliary memory. The main memory, for example, is a RAM. The main memory is used as a work area for the CPU 1701. The auxiliary memory is, for example, a nonvolatile memory, such as a magnetic disk, an optical disk, or a flash memory. Various programs that cause the information processing apparatus 1700 to operate are stored in the auxiliary memory. The program that is stored in the auxiliary memory is loaded onto the main memory and is executed by the CPU 1701.

The wired communication interface 1703 with the wired connection in the wireless base station 100 is a communication interface that performs communication with any other apparatus (for example, the wireless apparatus 110). The wired communication interface 1704 is a communication interface for performing communication with a higher-layer apparatus in the wireless base station 100, in a wired manner. Each of the wired communication interfaces 1703 and 1704 is controlled by the CPU 1701.

The IF processing units 121 that illustrated in FIG. 1, for example, may be realized by the wired communication interface 1703. Each of the second processing unit 122 and the control unit 123 that are illustrated in FIG. 1, for example, may be realized by the CPU 1701 or the wired communication interface 1703 or any combination thereof. Furthermore, transfer of a signal between the second processing unit 122 and a higher-layer apparatus in the wireless base station 100, for example, may be performed through the wired communication interface 1704.

A hardware configuration of the wireless control apparatus 120 is not limited to a hardware configuration that is illustrated in FIG. 17. For example, a configuration that corresponds to the CPU 1701 or the memory 1702 may be realized using an FPGA, a DSP, or the like.

In this manner, according to the first embodiment, the wireless apparatus 110 may notify the wireless control apparatus 120 of the configuration information relating to the first signal processing by the wireless apparatus 110, which is in the base station signal processing, by the transfer path 101.

Accordingly, for example, based on the configuration information that is notified, the wireless control apparatus 120 may perform control of the second signal processing by the wireless control apparatus 120, which is in the base station signal processing. Alternatively, based on the configuration information that is notified, the wireless control apparatus 120 may perform control of a transfer method for transferring a signal to and from the wireless apparatus 110 by the transfer path. For example, a setting of a protocol for transferring a signal or a setting of a type of data of the signal that is to be transferred, or any combination thereof is included in the control of the transfer method. Alternatively, based on the configuration information that is notified, the wireless control apparatus 120 may perform the control of the second signal processing by the wireless control apparatus 120, which is in the base station signal processing, and the control of the transfer method for transferring the signal to and from the wireless apparatus 110 by the transfer path.

For this reason, for example, although the split point of the base station signal processing differs with the wireless apparatus 110, a signal may be transferred between the wireless apparatus 110 and the wireless control apparatus 120, and the wireless apparatus 110 and the wireless control apparatus 120 may perform the first signal processing and the second signal processing, respectively. For this reason, it is possible that multiple split points of the base station signal processing are existed together.

A configuration is described in which the wireless apparatus 110 notifies the wireless control apparatus 120 of the configuration information on the wireless apparatus 110, but a configuration may be applied in which the wireless control apparatus 120 notifies the wireless apparatus 110 of the configuration information on the wireless control apparatus 120. For example, a second notification unit (for example, the notification unit 124 in FIGS. 1 and 18) that notifies by the transfer path the wireless apparatus 110 of the configuration information relating to the second signal processing by the wireless control apparatus 120 which is in the base station signal processing may be provided in the wireless control apparatus 120.

Accordingly, for example, based on the configuration information that is notified, the wireless apparatus 110 may perform control of the first signal processing by the wireless apparatus 110, which is in the base station signal processing. Alternatively, based on the configuration information that is notified, the wireless apparatus 110 may perform control of a transfer method for transferring a signal to and from the wireless control apparatus 120 by the transfer path. Alternatively, based on the configuration information that is notified, the wireless apparatus 110 may perform the control of the first signal processing by the wireless apparatus 110, which is in the base station signal processing, and the control of the transfer method for transferring the signal to and from the wireless control apparatus 120 by the transfer path.

For this reason, for example, although the split point of the base station signal processing differs with the wireless control apparatus 120, a signal may be transferred between the wireless apparatus 110 and the wireless control apparatus 120, and the wireless apparatus 110 and the wireless control apparatus 120 may perform the first signal processing and the second signal processing, respectively. For this reason, it is possible that multiple split points of the base station signal processing are existed together.

A method in which the wireless control apparatus 120 notifies the wireless apparatus 110 of the configuration information is the same as a method in which the wireless apparatus 110 described above notifies the wireless control apparatus 120 of the configuration information. Control by the wireless apparatus 110, which is based on the configuration information that is notified by the wireless control apparatus 120, is the same as the control by the wireless control apparatus 120, which is based on the configuration information that is notified by the wireless apparatus 110 described above.

These configurations may be combined. For example, a configuration may be applied in which the wireless apparatus 110 notifies the wireless control apparatus 120 of the configuration information on the wireless apparatus 110 and in which the wireless control apparatus 120 notifies the wireless apparatus 110 of the configuration information on the wireless control apparatus 120.

According to the first embodiment, the wireless apparatuses 110a and 110b may be connected to the wireless control apparatus 120, and the signal between the wireless control apparatus 120 and the wireless apparatus 110a and the signal between the wireless control apparatus 120 and the wireless apparatus 110b may be transmitted through the same transfer path. For this reason, it is possible that multiple split points of the signal processing in the wireless base station take place are existed together.

For example, the wireless control apparatus 120 may add the identification information in accordance with the processing that is included in the first signal processing by the wireless apparatus 110a, to a first signal destined for the wireless apparatus 110a. The wireless control apparatus 120 may add the identification information in accordance with the processing that is included in the first signal processing by the wireless apparatus 110b, to a second signal destined for the wireless apparatus 110b. In this case, the wireless control apparatus 120 transfers the first signal to the wireless apparatus 110a by the transfer path using a transfer method that is based on the identification information which is added to the first signal. The wireless control apparatus 120 transfers the second signal to the wireless apparatus 110b by the transfer path using a transfer method that is based on the identification information that is added to the second signal.

Accordingly, although the wireless apparatuses 110a and 110b are different from each other in the split point of the base station signal processing, a signal may be transmitted to each of the wireless apparatuses 110a and 110b, using a transfer method in accordance with the split point of the base station signal processing for each of the wireless apparatuses 110a and 110b. For this reason, it is possible that multiple split points of the base station signal processing are existed together.

The wireless apparatus 110a may add the identification information in accordance with the processing that is included in the first signal processing by the wireless apparatus 110a, to a signal destined for the wireless control apparatus 120. In this case, the wireless apparatus 110a transfers the signal destined for the wireless control apparatus 120 by the transfer path, using a transfer method that is based on the identification information that is added to the signal destined for the wireless control apparatus 120. Accordingly, although the wireless apparatuses 110a and 110b are different from each other in the split point of the base station signal processing, the wireless control apparatus 120 may receive a signal from the wireless apparatus 110a using a transfer method that is based on the identification information that is added to the signal from the wireless apparatus 110a.

In the first embodiment, a configuration may be applied in which the transmission of the identification information described above is not performed. Even in this case, the configuration information described above is transmitted and thus the setting of the first signal processing or the second signal processing, or the control of the method of transferring a signal may be performed. For this reason, it is possible that multiple split points of the base station signal processing are existed together.

In this case, a configuration may be applied in which a method of performing transferring by the transfer path is set for every destination based on the configuration information. Accordingly, a signal may be transmitted between the wireless control apparatus 120 and each of the wireless apparatus 110a and 110b, using a transfer method in accordance with the split point of the base station signal processing. For this reason, it is possible that multiple split points of the base station signal processing are existed together.

In the first embodiment, a configuration may be applied in which the transmission of the configuration information described above is not performed.

Even in this case, the identification information described above is transmitted, and thus a signal may be transmitted between the wireless control apparatus 120 and each of the wireless apparatus 110a and 110b, using the transfer method in accordance with the split point of the base station signal processing. For this reason, it is possible that multiple split points of the base station signal processing are existed together.

A configuration may be applied in which, in a case where multiple wireless apparatuses 110 are connected directly or indirectly to the wireless control apparatus 120, the wireless apparatus 110 transmits the configuration information on the wireless apparatus 110 itself to any other wireless apparatus 110.

Second Embodiment

A portion of a second embodiment, which differs from that of the first embodiment, is described. In the second embodiment, for example, a configuration is described in which the wireless control apparatus 120 transmits the configuration information that is received from the wireless apparatus 110, to the wireless terminal.

(Wireless Base Station According to the Second Embodiment)

Figure 18:
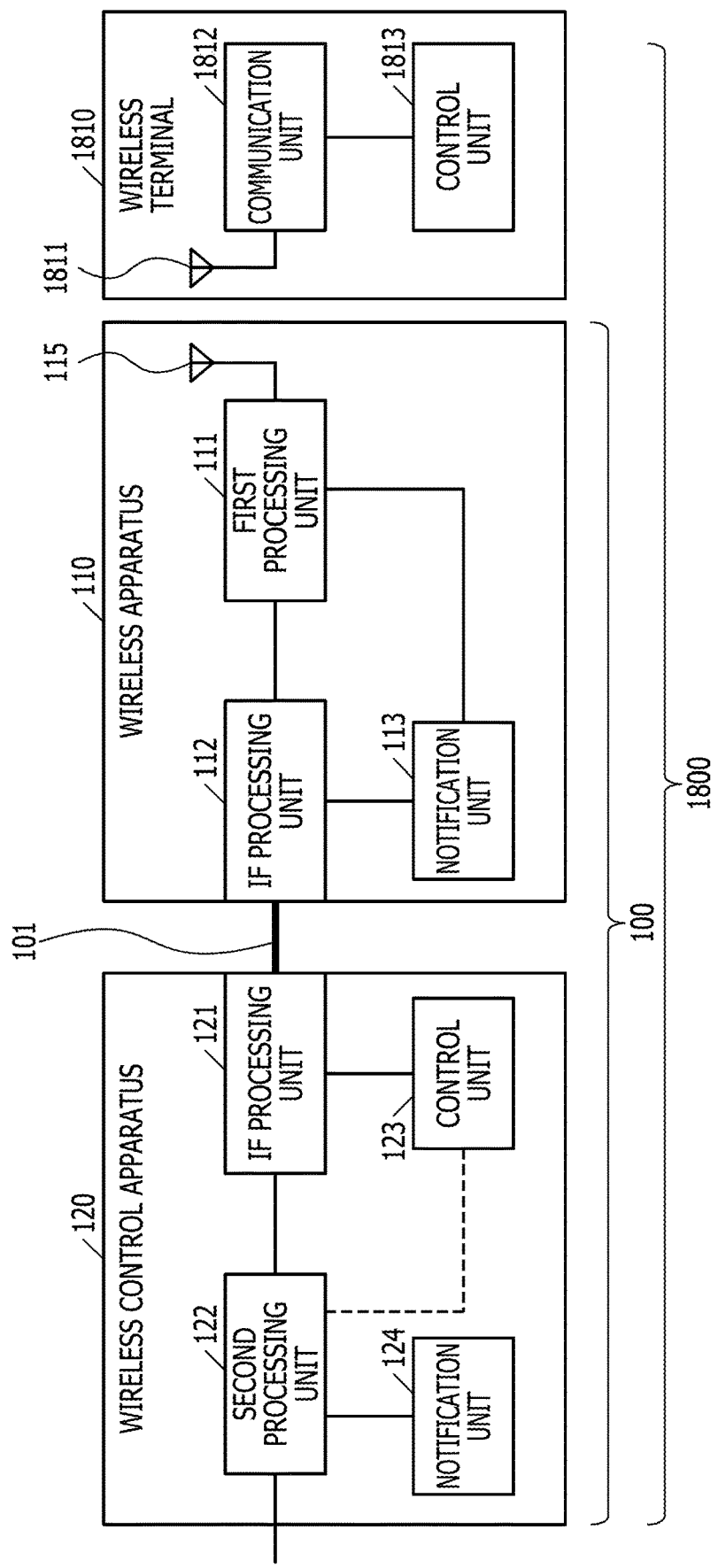
FIG. 18 is a diagram illustrating an example of a wireless communication system according to a second embodiment.

FIG. 18 is a diagram illustrating an example of a wireless communication system according to a second embodiment. In FIG. 18, a portion that is the same as the portion that is illustrated in FIG. 1 is given the same reference numeral and a description thereof is omitted. As illustrated in FIG. 18, a wireless communication system 1800 according to the second embodiment includes the wireless base station 100 and a wireless terminal 1810. The wireless terminal 1810 is a wireless terminal that performs communication with the wireless base station 100 described above.

The wireless base station 100 transmits configuration information relating to the first signal processing by the first processing unit 111 and the second signal processing by the second processing unit 122, to the wireless terminal 1810, in a state of being associated with a cell that is formed by the wireless apparatus 110. The configuration information is information relating to the split point of the above-described base station signal processing in accordance with the distribution of the base station signal processing as the first signal processing and the second signal processing. The processing that transmits the configuration information to the wireless terminal 1810, for example, may be performed by the second processing unit 122.

For example, in a case where the processing that transmits the configuration information to the wireless terminal 1810 is performed in the second processing unit 122, the control unit 123 notifies the second processing unit 122 of the configuration information on the wireless apparatus 110 that is acquired through the IF processing unit 121. In contrast, the second processing unit 122 stores a signal destined for the wireless terminal 1810 that is notified by the control unit 123, and transmits the signal in which the configuration information is stored, to the wireless apparatus 110 through the IF processing unit 121.

Accordingly, the configuration information may be transmitted from the wireless base station 100 to the wireless terminal 1810. However, no limitation a configuration in which the configuration information on the wireless apparatus 110, as is, is transmitted to the wireless terminal 1810 is imposed. For example, the wireless base station 100 may perform a type-of-data or format conversion on the configuration information on the wireless apparatus 110 and then may transmit a result of the conversion to the wireless terminal 1810. For example, the configuration information that is transmitted by the wireless base station 100 to the wireless terminal 1810 may be information, based on which the wireless terminal 1810 possibly specifies the split point of the base station signal processing in the wireless base station 100 described above.

In a case where multiple wireless apparatuses 110 (for example, the wireless apparatuses 110a and 110b) are connected to the wireless control apparatus 120, the wireless base station 100 may transmit the configuration information on each of the multiple wireless apparatuses 110 to the wireless terminal 1810. In this case, pieces of configuration information on the multiple wireless apparatuses 110 may be transmitted using multiple wireless apparatuses 110, respectively, and may be collectively transmitted using one or several wireless apparatuses of the multiple wireless apparatuses 110.

The wireless terminal 1810, for example, includes an antenna 1811, a communication unit 1812, and a control unit 1813. The communication unit 1812 receives a signal that is wirelessly transmitted from the wireless apparatus 110, through the antenna 1811. The communication unit 1812 outputs the received signal to the control unit 1813.

Based on the configuration information that is included in the signal which is output from the communication unit 1812, the control unit 1813 selects a cell that is a connection destination of the wireless terminal 1810 itself, from among cells that include a cell which is formed by the wireless base station 100. The control unit 1813 performs control desirable for the wireless terminal 1810 itself to make a connection to the selected cell.

(Processing in the Wireless Communication System According to the Second Embodiment)

Figure 19:
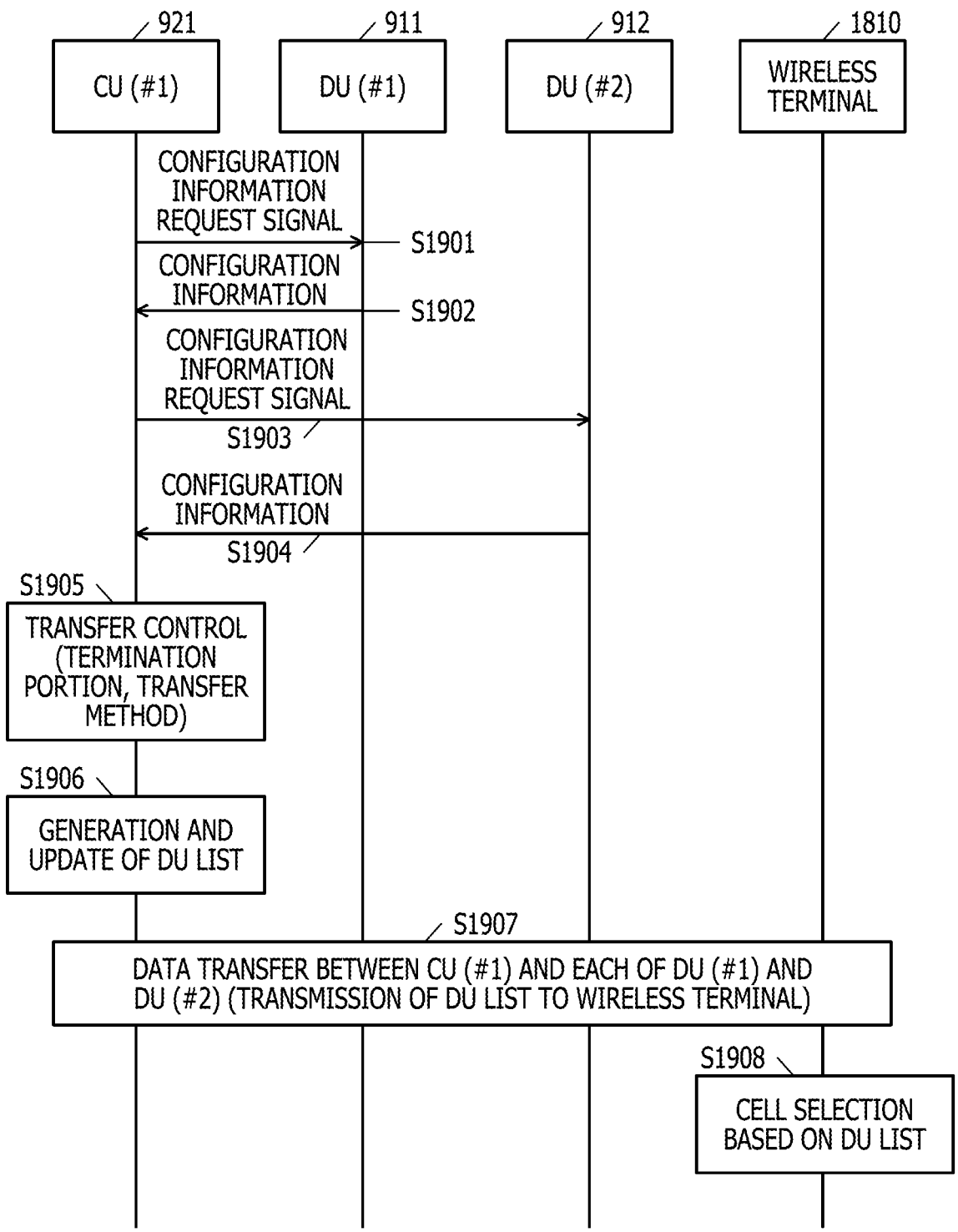
FIG. 19 is a sequence diagram illustrating an example of processing in the wireless communication system according to the second embodiment.

FIG. 19 is a sequence diagram illustrating an example of processing in the wireless communication system according to the second embodiment. The case where the wireless base station 100 is realized by the CU 921 (#1) and the DUs 911 and 912 (#1 and #2) that are illustrated in FIG. 9 is described with reference with FIG. 19. In this case, for example, the CU 921 and the DUs 911 and 912 may be applied to the wireless control apparatus 120 and the wireless apparatuses 110a and 110b that are illustrated in FIG. 8, respectively.

In the state where the DUs 911 and 912 are connected to the CU 921, for example, each step that is illustrated in FIG. 19 is performed. Steps S1901 to S1905 that are illustrated in FIG. 19 are the same as Steps S1001 and S1005 that are illustrated in FIG. 10.

Subsequent to Step S1905, the CU 921 generates a DU list based on pieces of configuration information that are received in Step S1902 and S1904 (Step S1906). The DU list is information that includes pieces of configuration information on the multiple wireless apparatus 110 described above. An example of the DU list will be described below. In Step S1906, in a case where the DU list is completely generated, based on the pieces of the configuration information that are received Steps S1902 and S1904, the CU 921 may update the completely generated DU list.

Subsequently, data transfer is performed between the CU 921 and each of the DUs 911 and 912 (Step S1907). Accordingly, it is possible that the CU 921 performs data transfer to and from the wireless terminal through the DUs 911 and 912. The DU list that is generated or updated in Step S1906 is included in downlink data among pieces of data that are transferred in Step S1907. For example, the CU 921 is the DU 911 or the DU 912 or any combination thereof, and transmits the DU list is generated or updated in Step S1906, to the wireless terminal 1810.

Subsequently, based on the DU list that is received in Step S1907, the wireless terminal 1810 makes a cell selection, that is, a selection of a cell which is a connection destination of the wireless terminal 1810 itself, from among cells that include the cell that is formed by the wireless base station 100 (Step S1908).

The processing in the case where the wireless base station 100 is realized by the CU 921 (#1) and the DUs 911 and 912 (#1 and #2), which are illustrated in FIG. 19, is described, but the same is also true for processing in a case where the wireless base station 100 is realized by any other CU and any other DU.

The wireless base station 100 may transmit individually the DU list to the wireless terminal 1810, and may broadcast (report) to each wireless terminal within the cell that is formed by the wireless base station 100. The reporting as system information or common control information to each wireless terminal may be performed.

(DU List According to the Second Embodiment)

FIG. 20 is a diagram illustrating an example of the DU list according to the second embodiment. The wireless base station 100, for example, transmits a DU list 2000 that is illustrated in FIG. 20, to the wireless terminal 1810. The DU list 2000 includes a DU identifier, a cell ID, a downlink frequency, a cell selection parameter, and a DU category of every DU (wireless apparatus 110) that are included in the wireless base station 100.

First, the DU identifier in the DU list 2000 is described. The DU identifier is an identifier of a DU that corresponds to the wireless apparatus 110. As an example, 1024 values from 0 to 1023 are used for the DU identifier. In an example that is illustrated in FIG. 20, three DUs, as wireless apparatuses 110, are connected to the wireless control apparatus 120 of the wireless base station 100, and DU identifiers of the three DUs are 1, 2, and 3, respectively.

Subsequently, the cell ID in the DU list 2000 is described. The cell ID is an identifier of a cell that is formed by a DU which corresponds to the wireless apparatus 110. As an example, 504 values from 0 to 503 are used for the cell ID. In the example that is illustrated in FIG. 20, cell IDs of cells that are formed by three DUs are 10, 10, and 11, respectively. For example, two DUs of the three DUs form the same cell with cell ID=10, and the remaining one DU forms a cell with ID=11.

In the wireless base station 100, for example, one DU is allocated to one cell. However, for example, when it is considered that one DU is equivalent to one antenna, multiple DUs are set for one cell in MIMO, AAA, Diversity, and the like that use multiple antennas. MIMO is short for Multiple Input Multiple Output. AAA is short for Adaptive Array Antenna. It may also be considered that AAA is equivalent to beamforming.

In 5G, there is also a likelihood that multiple DUs will be allocated to one cell. For example, it is also considered that, within a system band such as F-OFDM, a subcarrier interval or symbol length differs and that an SCB which is configured with multiple subcarriers is set, and there is a likelihood that one DU will be allocated to one SCB. F-OFDM is short for Filtered-OFDM. OFDM is short for Orthogonal Frequency Division Multiplexing. SCB is short for Subcarrier Block. The SCB may be a cluster or a frequency band. Multiple SCBs may be set for one cell. For this reason, there is a likelihood that multiple DUs will be allocated to one cell.

For example, the number of cell IDs in LTE are 168× 3=504, but there is also a likelihood that the number of cell IDs in 5G will not be 504. With the introduction of massive MIMO, there is also a likelihood that a cell ID or a beam ID will be given to each beam or that a cell ID or an SCB ID will be given to every SCB as described above. Considering these, a cell ID may be included in the CU and DU list 2000. A cell ID is also included in a neighboring-cell list in LTE, which will be described below.

The downlink frequency in the DU list 2000 is described. The downlink frequency is a frequency [MHz] of a wireless signal that is transmittable by a corresponding DU to the wireless terminal 1810. As is the case with the neighboring-cell list in LTE, instead of the downlink itself, a value that is calculated from the downlink frequency may be used for the DU list 2000. As an example, the formula that is specified in 3GPP TS36.101 5.7.3 may be used as a formula for calculating this value.

As an example, the downlink frequency in the DU list 2000 is a center frequency of a downlink frequency, but may be a lower-limit or upper-limit frequency of the downlink frequency of which a bandwidth is already known. Instead of the downlink frequency, or in addition to the downlink frequency, an uplink frequency may be included in the DU list 2000. A bandwidth of the downlink frequency or the uplink frequency may be included in the DU list 2000. These assume FDD, but in the case of TDD, the uplink frequency and the downlink frequency are the same. Because of this, a frequency may not be added and may be added. FDD is short for Frequency Division Duplex. TDD is short for Time Division Duplex.

The cell selection parameter in the DU list 2000 is described. The cell selection parameter is a parameter with which the wireless terminal 1810 selects a cell. For example, a parameter for the cell reselection is included in the neighboring-cell list in LTE. Similarly, it is also possible that the cell selection parameter is included in the DU list 2000. The cell selection parameter may be a parameter that may be used for an initial cell selection without being limited to the cell reselection.

The cell selection in the wireless terminal 1810, for example, is performed based on received power and received quality. The received power is Reference Signal Received Power (RSRP) in the case of LTE. The received quality is Reference Signal Received Quality (RSRQ) in the case of LTE. A parameter for performing correction on the received power or the received quality is used for the cell selection in LTE. For example, an actual cell selection parameter is an offset value, a coefficient, or the like. As an example of the actual cell selection parameter, a parameter that is specified in 3GPP TS36.304 5.2.3 or 5.2.4, or the like may be used. As an example, a specific value of the parameter is specified in 3GPP TS36.331 or the like.

The DU category in the DU list 2000 is described. The DU category is a DU category that corresponds to the split point of the base station signal processing described above (for example, refer to FIG. 15). For example, there is a one-to-one correspondence relationship between the split point of the base station signal processing and the DU category. In the example that is illustrated in FIG. 20, DU categories of DUs with DU identifiers 1 to 3 are 1, 3, and 5, respectively.

Based on the DU list 2000 that is transmitted from the wireless base station 100, the wireless terminal 1810 selects a cell that is a connection destination. At this time, the wireless terminal 1810, for example, uses the DU category that is included in the DU list 2000, for the cell selection. Various methods may be used for the cell selection that is based on the DU category.

For example, the less processing that is included in the first signal processing by the wireless apparatus 110 there is in the DU category, the smaller is a volume of signals that are to be transferred through the interface between the CU and the DU in a case where the same user data is transferred. For this reason, transfer of pieces of user data for many users is possible. On the other hand, the more processing that is included in the first signal processing by the wireless apparatus 110 there is in the DU category, the larger is a volume of signals that are to be transferred through the interface between the CU and the DU in the case where the same user data is transferred. For this reason, because of a limitation in a speed through the interface between the CU and DU, it is difficult to transfer pieces of data for many users.

In contrast, for example, in a case where QoS of data that is transferred to and from the wireless base station 100 is QoS that requests transfer of a large volume of signals, the wireless terminal 1810 selects a cell in a DU category in which the processing that is included in the first signal processing is comparatively less or the processing time for signal processing is short. QoS is short for Quality of Service. In a case where the QoS of data that is transferred to and from the wireless base station 100 is QoS that does not request transfer of a large amount, the wireless terminal 1810 selects a cell in a DU category in which the comparatively more processing is included in the first signal processing or the processing time for signal processing is long.

In some cases, due to the split point of the base station signal processing, a transfer delay, an error rate, scheduling precision, or the like differs without any limitation to the volume of signals through the above-described interface between the CU and the DU. In this case, the wireless terminal 1810 may select a cell according to the transfer delay, the error rate, the scheduling precision, or the like that is requested in the QoS of data that is transferred to and from the wireless base station 100.

Subsequently, the neighboring-cell list is described. For example, in LTE, SIB 4 or SIB 5 that specifies a neighboring cell for the cell reselection is used. SIB is short for System Information Block.

SIB 4 is system information relating to the neighboring-cell list for an intra-frequency, that is, the same frequency. The content of a list for SIB 4 is configured with PhysCellID (which, in some cases, is referred to as a physical ID or a PCI), that is, a cell ID, and q-OffsetCell that is a parameter that is used for the cell reselection. The parameter that is used for the cell reselection, for example, is specifies in 3GPP TS 36.304.

SIB 5 is system information relating to the neighboring-cell list for the inter-frequency, that is, different frequencies. For example, a downlink frequency (dl-CarrierFreq), Neigh-CellConfig, inteFreqNeighCellList, and the parameter for the cell reselection are included, as interFreqCarrier-FreqList, in SIB 5. NeighCellConfig includes information indicating whether or not the neighboring cell is for MBSFN, information for setting a UL and a DL in TDD, or the like. MBSFN is short for MBMS Single Frequency Network. MBMS is short for Multimedia Broadcast and Multicast Service. TDD is short for Time Division Duplex. UL and DL is short for Uplink and Downlink. In the same manner as in SIB 4, the cell ID and the parameter for the cell reselection are included in interFreqNeighCellList. In this manner, the frequency, the cell ID, and the parameter for the cell reselection are included in the neighboring-cell list.

As an example, the DU list 2000 described above may be set to contain information that results from adding a DU category of every DU to the neighboring-cell list. However, the DU list 2000 is not limited to this information, and for example, may set to contain various pieces of information indicating a DU category of every DU. Pieces of information that are various names, such as classification, type, and capability, as pieces of information which are equivalent to the above-described categories, may be used.

(Hardware Configuration of a Wireless Terminal According to the Second Embodiment)

Figure 21:
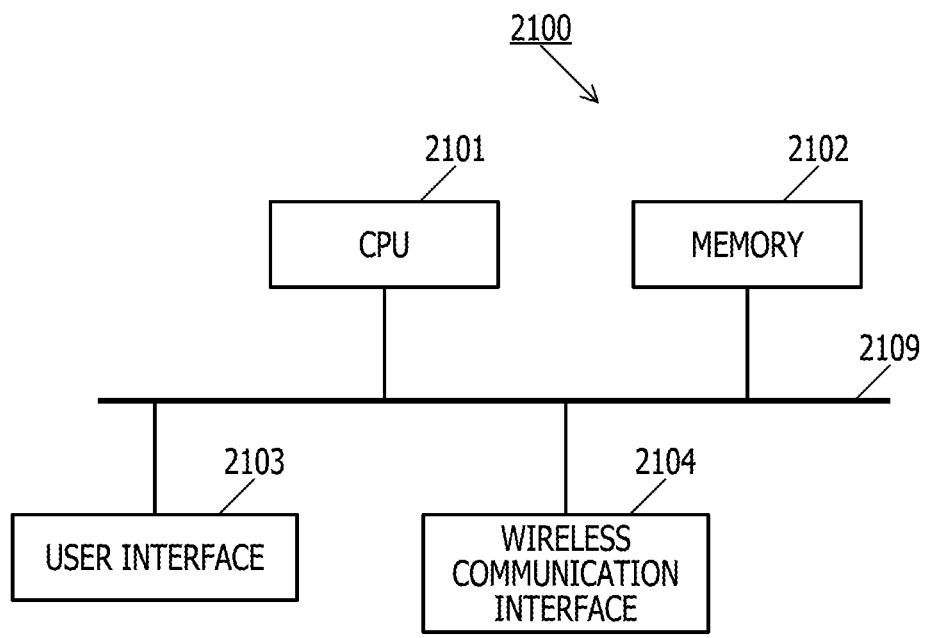
FIG. 21 is a diagram illustrating an example of a hardware configuration of a wireless terminal according to the second embodiment.

FIG. 21 is a diagram illustrating an example of a hardware configuration of a wireless terminal according to the second embodiment. The wireless terminal 1810 that is illustrated in FIG. 18, for example, may be realized by a communication apparatus 2100 that is illustrated in FIG. 21. Hardware Configuration of a Wireless Terminal according to the Second Embodiment. The communication apparatus 2100 includes a CPU 2101, a memory 2102, a user interface 2103, and a wireless communication interface 2104. The CPU 2101, the memory 2102, the user interface 2103, and the wireless communication interface 2104 are connected to each other with a bus 2109.

The CPU 2101 manages control of the entire communication apparatus 2100. The memories 2102, for example, include a main memory and an auxiliary memory. The main memory, for example, is a RAM. The main memory is used as a work area for the CPU 2101. The auxiliary memory is, for example, a nonvolatile memory such as a magnetic disk or a flash memory. Various programs that cause the communication apparatus 2100 to operate are stored in the auxiliary memory. The program that is stored in the auxiliary memory is loaded onto the main memory and is executed by the CPU 2101.

The user interfaces 2103, for example, includes an input device into which an operation from a user is input, and an output device that outputs information to the user. The input device, for example, may be realized by a key (for example, a keyboard), a remote controller, or the like. The output device, for example, may be realized by a display, a speaker, or the like. The input device and the output device may be realized by a touch panel or the like. The user interface 2103 is controlled by the CPU 2101.

The wireless communication interface 2104 is a communication interface that performs communication with the outside (for example, the wireless base station 100) of the communication apparatus 2100 in a wireless manner. The wireless communication interface 2104 is controlled by the CPU 2101.

The antenna 1811 that is illustrated in FIG. 18, for example, is included in the wireless communication interface 2104. Each of the communication unit 1812 and the control unit 1813 that are illustrated in FIG. 18, for example, may be realized by the CPU 2101 or the wireless communication interface 2104 or any combination thereof.

Furthermore, a hardware configuration of the wireless terminal 1810 is not limited to a hardware configuration that is illustrated in FIG. 21. For example, a configuration that corresponds to the CPU 2101 or the memory 2102 may be realized using an FPGA, a DSP, or the like.

In this manner, according to the second embodiment, the configuration information relating to the first signal processing by the wireless apparatus 110, which is in the base station signal processing, may be transmitted to the wireless terminal 1810. Accordingly, it is possible that the wireless terminal 1810 selects a cell that is a connection destination of the wireless terminal 1810 itself according to the split point of the base station signal processing.

A configuration is described in which the wireless control apparatus 120 transmits the configuration information on the wireless apparatus 110 to the wireless terminal 1810, but a configuration may be applied in which the wireless apparatus 110 transmits the configuration information on the wireless control apparatus 120 to the wireless terminal 1810.

The cell selection in accordance with the above-described configuration information may be made in the wireless base station 100 instead of the wireless terminal 1810. In this case, the configuration information may not be transmitted from the wireless base station 100 to the wireless terminal 1810.

A configuration may be applied in which, instead of the DU list providing the DU category of every DU described above, or in addition to the DU list, a CU list providing a CU category of every CU is transmitted to the wireless terminal 1810. The CU category, for example, is a category that corresponds to the split point in accordance with the processing that is included in the second signal processing by the CU.

As described above, with the wireless base station, the wireless apparatus, the wireless control apparatus, the wireless communication system, the communication method, and the wireless terminal, multiple split points of the signal processing in the wireless base station may be set to be possibly existed together.

For example, it is assumed that in the future, with the introduction of massive MIMO or beamforming, the number of antennas increases. In these technologies, transmission data differs from one antenna to another, and the DU is demanded for every antenna. For this reason, an amount of data that is transferred by the interface between the CU and the DU increases. In contrast, for example, a transfer speed of the CPRI is 24 [GHz] at a maximum, and there is a likelihood that an increase in this amount of data will not be able to dealt with. For this reason, a study on a new interface (a protocol) as the interface between the CU and the DU is demanded.

A configuration in which multiple DUs are connected to the CU in the cascade topology and multi-hop transfer is performed has been studied. In this case, when the split points of the base station signal processing, to which multiple DUs, respectively, correspond, differ, signals that differ in the type of data are transferred through the interface between the CU and the DU. For example, as an example in which the split points of the base station signal processing, to which multiple DUs correspond, respectively, differ, a configuration is considered in which a DU (for example, a RRH) in 4G and a DU (for example, an RE) in 5G are connected to the CU. Therefore, the correspondence to multiple split points of the base station signal processing is demanded for the interface between the CU and the DU.

In a configuration in which multiple CUs are connected in the star topology to the CU, when the split points of the base station signal processing to which multiple DUs, respectively, correspond, differ, signals that differ in the type of data are also transferred through the interface between the CU and the DU that corresponds to each DU. Therefore, specification of a method of transferring signals that differ in the split point of the base station signal processing is demanded for the interface between the CU and the DU that corresponds to each DU.

At present, many candidates for the split point of the base station signal processing have been studied. The candidates for the split point of the base station signal processing, for example, have been studied for 3GPP TR 38.801 V0.2.0 6.1.2.1 or the like. It is considered that multiple candidates, among these candidates, are applied, and that multiple split points of the base station signal processing are existed together within a system or within a wireless base station.

In contrast, according to each of the embodiments described above, it is possible that multiple split points of the base station signal processing are existed together.

In each of the embodiments described above, the connection in the cascade topology or the connection in the star connection, as the method of making connections to multiple wireless apparatus 110 (DUs), is described, but the method of making connections to multiple wireless apparatuses 110 is not limited to this. For example, a configuration may be configured in which multiple wireless apparatuses 110 may be connected in a link topology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless base station for communicating with a wireless terminal, the wireless base station comprising:
    a wireless apparatus configured to transmit a radio signal to the wireless terminal and receive a radio signal from the wireless terminal; and
    a wireless control apparatus configured to perform wireless communication with the wireless terminal through the wireless apparatus, wherein signal processing of wireless terminal user data is split between the wireless apparatus and the wireless control apparatus of the wireless base station, the wireless apparatus and the wireless control apparatus of the wireless base station connected via a transmission path,
    the wireless apparatus performing a first part of signal processing of the wireless terminal user data, and the wireless control apparatus performing a second part of signal processing of the wireless terminal user data,
    wherein the wireless control apparatus is configured to, based on the first part of signal processing, perform at least any of a first control and a second control, the first control being control of the second part of signal processing, the second control being control of a transfer method for transferring a signal on which signal processing is performed, to and from the wireless apparatus, and
    wherein the second part of signal processing of the wireless terminal user data is in a unit of packet data convergence protocol packet data unit (PDCP PDU), the wireless control apparatus transferring the second part of signal processing of the wireless terminal user data to the wireless apparatus via the transmission path.

2. The wireless base station according to claim 1, wherein the wireless apparatus is configured to, based on the second part of signal processing, perform at least any of a first control and a second control, the first control being control of the first part of signal processing, the second control being control of a transfer method for transferring a signal on which signal processing is performed, to and from the wireless control apparatus.

3. The wireless base station according to claim 1, wherein the control of the transfer method includes at least any of a third control and a fourth control, the third control being control of a protocol for transferring the signal, the fourth control being control of a type of data of the signal that is to be transferred.

4. The wireless base station according to claim 1, wherein the wireless control apparatus is configured to perform processing that transmits to the wireless terminal first information related to the first part of signal processing and information relating to a cell formed by the wireless apparatus.

5. The wireless base station according claim 1, wherein the wireless apparatus is configured to perform processing that notifies the wireless terminal of second information related to the second part of signal processing and the information relating to a cell that is formed by the wireless apparatus.

6. The wireless base station according to claim 1, wherein the wireless apparatus is configured to:
- perform first reception processing on a first signal received from the wireless terminal, the first reception processing being a part of the first part of signal processing,
- transfer the first signal on which the first reception processing is performed, to the wireless control apparatus, and
- wirelessly transmit, to the wireless terminal, a second signal that results from performing first transmission processing on a third signal received form the wireless control apparatus, the first transmission processing being a part of the first part of signal processing, and wherein the wireless control apparatus is configured to:
- perform second reception processing on the first signal that is received from the wireless apparatus, the second reception processing being a part of the second part of signal processing,
- transfer the first signal on which the second reception processing is performed, to a higher-level apparatus in the wireless base station,
- perform second transmission processing on a fourth signal received from the higher-level apparatus, the second transmission processing being a part of the second part of signal processing,
- transfer, to the wireless apparatus, the fourth signal on which the second transmission processing is performed.

7. A wireless apparatus for a wireless base station configured to perform wireless communication with a wireless terminal, the wireless base station including the wireless apparatus and a wireless control apparatus, the wireless apparatus comprising:
- a control circuit configured to control receiving of user data from the wireless control apparatus in a unit of packet data convergence protocol packet data unit (PDCP PDU), the user data being data processed by a second signal processing circuit of the wireless control apparatus, the second signal processing circuit being configured to perform a second part of signal processing on the user data, the second part of signal processing being a part of signal processing for the wireless communication;
- a first signal processing circuit configured to perform a first part of signal processing on the received user data, the first part of signal processing being a part of the signal processing different from the second part of signal processing, wherein the wireless control apparatus is configured to, based on the first part of signal processing, perform at least any of a first control and a second control, the first control being control of the second part of signal processing, the second control being control of a transfer method for transferring a signal on which signal processing is performed, to and from the wireless apparatus; and
- a notification circuit configured to notify the wireless control apparatus of first information regarding the first part of signal processing.

8. The wireless apparatus according to claim 7, wherein the first signal processing circuit is configured to perform the first part of signal processing on a signal that is to be transferred via the wireless apparatus, and
wherein an interface is configured to perform signal transfer between the wireless control apparatus and a second wireless apparatus, the second wireless apparatus being one of a plurality of wireless apparatuses.

9. The wireless apparatus according to claim 8,
wherein the first signal processing circuit is configured to add information relating to the first part of signal processing, to a first signal for the wireless control apparatus, and
wherein the interface is configured to transfer a signal to the wireless control apparatus by using a transfer method that is based on the information associated with the first signal for the wireless control apparatus.

10. A wireless control apparatus for a wireless base station configured to perform wireless communication with a wireless terminal, the wireless base station including the wireless apparatus and a wireless control apparatus, the wireless control apparatus comprising:
- a signal processing circuit configured to perform a second part of signal processing on user data, the second part of signal processing being a part of signal processing for the wireless communication,
- a first notification circuit configured to notify the wireless apparatus of first information regarding the second part of signal processing, and
- a control circuit configured to perform transmitting of the processed user data to the wireless apparatus in a unit of packet data convergence protocol packet data unit (PDCP PDU), the processed user data being a user data processed by the signal processing circuit.

11. The wireless control apparatus according to claim 10,
wherein the signal processing circuit includes a first processor and a second processor;
wherein the first processor is configured to perform the second part of signal processing on a first signal that is to be transferred via a first wireless apparatus to any of one or more of wireless terminals;
wherein the second processor is configured to perform the second part of signal processing on a second signal that is to be transferred via a second wireless apparatus to any of the one or more of wireless terminals, the second wireless apparatus including the wireless signal processing among the signal processing of the wireless base station; and
wherein an interface is configured to transmit the first signal to the first wireless apparatus and transmit the second signal to the second wireless apparatus.

12. The wireless control apparatus according to claim 11,
wherein the first processor is configured to add the first information to the first signal for the first wireless apparatus,
wherein the second processor is configured to add the second information to the second signal for the second wireless apparatus, and
wherein the interface is configured to
- transfer the first signal by using a transfer method that is based on the first information associated with the first signal, and
- transfer the second signal by using a transfer method that is based on the second information associated with the second signal.

13. The wireless control apparatus according to claim 11,
wherein the second part of signal processing by the second wireless apparatus is different from the second part of signal processing by the first wireless apparatus.

14. A wireless communication system comprising:
a wireless terminal; and
a wireless base station configured to perform wireless communication with the wireless terminal, the wireless base station including:

a wireless apparatus; and a wireless control apparatus, the wireless apparatus configured to transmit a radio signal to the wireless terminal and receive a radio signal from the wireless terminal, the wireless control apparatus configured to perform wireless communication with the wireless terminal through the wireless apparatus, wherein the wireless control apparatus includes:

a second signal processing circuit configured to perform a second part of signal processing on user data, the second part of signal processing being a part of signal processing for the wireless communication, a second notification circuit configured to notify the wireless apparatus of second information regarding the second part of signal processing, and a control circuit configured to perform transmitting of the processed user data to the wireless apparatus in a unit of packet data convergence protocol packet data unit (PDCP PDU), the processed user data being a user data processed by the second signal processing circuit, wherein the wireless apparatus includes:

a first control circuit configured to control receiving of the processed user data from the wireless control apparatus in the unit of PDCP PDU, a first signal processing circuit configured to perform a first part of signal processing on the received user data, the first part of signal processing being a part of the signal processing different from the second part of signal processing, wherein the wireless control apparatus is configured to, based on the first part of signal processing, perform at least any of a first control and a second control, the first control being control of the second part of signal processing, the second control being control of a transfer method for transferring a signal on which signal processing is performed, to and from the wireless apparatus, and a first notification circuit configured to notify the wireless control apparatus of first information regarding the first part of signal processing.

15. A communication method implemented by a wireless base station for communicating with a wireless terminal, the wireless base station including a wireless apparatus and a wireless control apparatus, the wireless apparatus being configured to transmit a radio signal to the wireless terminal and receive a radio signal from the wireless terminal, the wireless control apparatus being configured perform wireless communication with the wireless terminal through the wireless apparatus, the communication method comprising:

splitting signal processing of wireless terminal user data between the wireless apparatus and the wireless control apparatus of the base station, the wireless apparatus and the wireless control apparatus of the base station connected via a transmission path;

performing, by the wireless apparatus, a first part of signal processing on wireless terminal user data, the first part of signal processing being a part of signal processing for the wireless communication;

notifying, by the wireless apparatus, the wireless control apparatus of first information regarding the first part of signal processing;

performing, by the wireless control apparatus, a second part of signal processing on the wireless terminal user data;

performing, by the wireless control apparatus, based on the first part of signal processing, at least any of a first control and a second control, the first control being control of the second part of signal processing, the second control being control for transferring a signal on which signal processing is performed to and from the wireless apparatus;

transmitting via the transmission path, by the wireless control apparatus, the processed wireless terminal user data to the wireless apparatus in a unit of packet data convergence protocol packet data unit (PDCP PDU); and receiving, by the wireless apparatus, the processed wireless terminal user data from the wireless control apparatus in the unit of PDCP PDU.

* * * * *